(12) United States Patent
Moran et al.

(10) Patent No.: US 12,294,615 B2
(45) Date of Patent: May 6, 2025

(54) USING A REQUESTOR IDENTITY TO ENFORCE A SECURITY POLICY ON A NETWORK CONNECTION THAT CONFORMS TO A SHARED-ACCESS COMMUNICATION PROTOCOL

(71) Applicant: Microsoft Technology Licensing, LLC, Redmond, WA (US)

(72) Inventors: Or Moran, Rishon LeZion (IL); Vladimir Perelman, Rishon LeZion (IL); Meital Ben David, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 17/847,117

(22) Filed: Jun. 22, 2022

(65) Prior Publication Data

US 2023/0421608 A1 Dec. 28, 2023

(51) Int. Cl.
*H04L 9/40* (2022.01)

(52) U.S. Cl.
CPC ............ *H04L 63/20* (2013.01); *H04L 63/083* (2013.01)

(58) Field of Classification Search
CPC .............................. H04L 63/20; H04L 63/083
See application file for complete search history.

(56) References Cited

U.S. PATENT DOCUMENTS

| | | | | |
|---|---|---|---|---|
| 5,564,017 A | * | 10/1996 | Corn | G06F 11/1438 709/227 |
| 5,937,159 A | | 8/1999 | Meyers | |
| 7,904,447 B1 | * | 3/2011 | Russell | H04L 12/66 707/726 |
| 8,225,385 B2 | * | 7/2012 | Chow | H04W 12/084 713/168 |

(Continued)

FOREIGN PATENT DOCUMENTS

| | | |
|---|---|---|
| CN | 111343132 A | 6/2020 |
| JP | 2009026022 A | 2/2009 |
| KR | 100976602 B1 | 8/2010 |

OTHER PUBLICATIONS

"International Search Report and Written Opinion Issued in PCT Application No. PCT/US2023/015150", Mailed Date: Jun. 16, 2023, 15 Pages.

(Continued)

*Primary Examiner* — Viet D Vu
(74) *Attorney, Agent, or Firm* — Wade IP Law PLLC

(57) ABSTRACT

Techniques are described herein that are capable of using a requestor identity to enforce a security policy on a network connection that conforms to a shared-access communication protocol. A request to create the network connection to a network resource is received. The network connection is associated with the requestor identity, which identifies a requesting entity associated with the request, by associating the request with the requestor identity and further by associating the network connection with the request. A determi- (Continued)

nation is made whether the requesting entity is authorized to access the network resource based at least in part on a permission that is indicated by the security policy. Based at least in part on the permission indicating that the requesting entity is authorized to access the network resource, the network connection to the network resource is created.

20 Claims, 11 Drawing Sheets

(56) References Cited

U.S. PATENT DOCUMENTS

| | | | |
|---|---|---|---|
| 8,544,073 B2 * | 9/2013 | Walter Silhavy | G06F 21/31 726/8 |
| 8,677,449 B1 | 3/2014 | Beda, III | |
| 8,695,090 B2 | 4/2014 | Barile et al. | |
| 9,047,476 B2 | 6/2015 | Chawla et al. | |
| 9,384,359 B2 | 7/2016 | Jacobson et al. | |
| 10,484,372 B1 * | 11/2019 | Johansson | H04L 63/083 |
| 11,082,444 B2 | 8/2021 | Macleod et al. | |
| 11,134,104 B2 | 9/2021 | Qureshi et al. | |
| 2005/0257265 A1 | 11/2005 | Cook et al. | |
| 2006/0288008 A1 * | 12/2006 | Bhattiprolu | G06F 16/1774 707/999.009 |
| 2008/0263653 A1 * | 10/2008 | Lee | H04L 63/08 726/10 |
| 2012/0163180 A1 | 6/2012 | Goel et al. | |
| 2014/0223513 A1 * | 8/2014 | Islam | H04L 63/1433 726/4 |
| 2015/0095597 A1 | 4/2015 | Ayanam et al. | |
| 2016/0212113 A1 * | 7/2016 | Banerjee | H04W 12/06 |
| 2017/0091482 A1 | 3/2017 | Sarin et al. | |
| 2017/0364707 A1 | 12/2017 | Lal | |
| 2018/0336334 A1 | 11/2018 | Yadav et al. | |
| 2019/0349357 A1 | 11/2019 | Shukla et al. | |
| 2020/0074097 A1 | 3/2020 | Hamlin | |
| 2021/0311641 A1 | 10/2021 | Prakashaiah et al. | |
| 2021/0312077 A1 | 10/2021 | Jain et al. | |
| 2021/0344602 A1 | 11/2021 | Lewin et al. | |
| 2023/0336465 A1 | 10/2023 | Lewin et al. | |
| 2024/0039892 A1 | 2/2024 | Lahiano | |

OTHER PUBLICATIONS

"International Search Report and Written Opinion Issued in PCT Application No. PCT/US20023/23040", Mailed Date: Aug. 18, 2023, 14 Pages.

"Notice of Allowance Issued in U.S. Appl. No. 17/720,133", Mailed Date: Jun. 5, 2023, 9 Pages.

Vice, et al., "Overview: VPN Split Tunneling for Microsoft 365", Retrieved from: https://docs.microsoft.com/en-us/microsoft-365/enterprise/microsoft-365-vpn-split-tunnel?view=o365-worldwide, Mar. 4, 2022, 12 Pages.

"Border Gateway Protocol", Retrieved from: https://en.wikipedia.org/wiki/Border_Gateway_Protocol, Mar. 24, 2022, 18 Pages.

"Check Point: Route-Based", Retrieved from: https://web.archive.org/web/20220324200852/https://docs.oracle.com/en-us/iaas/Content/Network/Reference/checkpointCPEroutebased.htm, Mar. 24, 2022, 8 Pages.

"Introduction—Valtix Documentation", Retrieved from: https://docs.valtix.com/aws/aws_workshop/introduction/, Retrieved Date: Apr. 21, 2022, 2 Pages.

"Meraki SD-WAN", Retrieved from: https://documentation.meraki.com/Architectures_and_Best_Practices/Cisco_Meraki_Best_Practice_Design/Best_Practice_Design_-_MX_Security_and_SD-WAN/Meraki_SD-WAN, Mar. 28, 2022, 34 Pages.

"MX Addressing and VLANs", Retrieved from: https://documentation.meraki.com/MX/Networks_and_Routing/MX_Addressing_and_VLANs, Jun. 17, 2021, 4 Pages.

"Networks and Tunnel Routing", Retrieved from: https://cloud.google.com/network-connectivity/docs/vpn/concepts/choosing-networks-routing, Retrieved on: Apr. 21, 2022, 9 Pages.

"Secure Application Workloads with Palo Alto Networks VM-Series Firewall", Retrieved from: https://docs.oracle.com/en/solutions/secure-app-palo-alto-firewall/index.html#GUID-CB6D7F26-0DEA-4B27-A265-E6169D8992E9, Retrieved on: Apr. 21, 2022, 15 Pages.

"Site-to-Site VPN Overview", Retrieved from: https://web.archive.org/web/20220120084208/https://docs.oracle.com/en-us/iaas/Content/Network/Tasks/overviewIPsec.htm, Jan. 20, 2022, 9 Pages.

"Traffic Management", Retreieved from: https://web.archive.org/web/20220301215855/https://istio.io/latest/docs/concepts/traffic-management/, Mar. 1, 2022, 16 Pages.

"What is a Network Load Balancer?", Retrieved from: https://web.archive.org/web/20201214113601/https://docs.aws.amazon.com/elasticloadbalancing/latest/network/introduction.html, Dec. 14, 2020, 3 Pages.

"What is an Application Load Balancer?", Retrieved from: https://web.archive.org/web/20201213163849/https://docs.aws.amazon.com/elasticloadbalancing/latest/application/introduction.html, Dec. 13, 2020, 4 Pages.

Bender, et al., "Virtual Network Traffic Routing", Retrieved from: https://docs.microsoft.com/en-us/azure/virtual-network/virtual-networks-udr-overview#custom-routes, Apr. 16, 2022, 19 Pages.

Keil, Matt, "Threat and Data-Theft Prevention Policies with VM-Series", Retrieved from: https://cloud.google.com/architecture/partners/threat-and-data-theft-prevention-policies-with-vm-series#protecting_apps_from_inbound_threats_and_outbound_data_theft, Jan. 23, 2019, 9 Pages.

Majumder, et al., "Dynamic Routing", Retrieved from: https://docs.citrix.com/en-us/citrix-sd-wan/current-release/routing/dynamic-routing.html, Jul. 28, 2021, 9 Pages.

Majumder, et al., "Zscaler Integration by using GRE Tunnels and IPsec Tunnels", Retrieved from: https://docs.citrix.com/en-us/citrix-sd-wan/current-release/security/citrix-sd-wan-secure-web-gateway/sd-wan-web-secure-gateway-using-gre-tunnels-and-ipsec-tunnels.html, Jun. 9, 2021, 10 Pages.

Panni, Jess, "AWS vs Azure vs Google Cloud Platform—Networking", Retrieved from: https://endjin.com/blog/2016/11/aws-vs-azure-vs-google-cloud-platform-networking, Nov. 14, 2016, 18 Pages.

Patel, Ashish, "Azure—Difference between Azure ExpressRoute and Azure VPN Gateway", Retrieved from: https://medium.com/awesome-azure/azure-difference-between-azure-expressroute-and-azure-vpn-gateway-comparison-azure-hybrid-connectivity-5f7ce02044f3, Sep. 6, 2021, 6 Pages.

Patel, Ashish, "Azure—Difference between Azure Load Balancer and Application Gateway", Retrieved from: https://medium.com/awesome-azure/azure-difference-between-azure-load-balancer-and-application-gateway-9a6019c23840, Jul. 1, 2020, 5 Pages.

Vaidyanathan, et al., "Network Transformation with AWS and Valtix for Workload Segmentation and Compliance", Retrieved from: https://aws.amazon.com/blogs/apn/network-transformation-with-aws-and-valtix-for-workload-segmentation-and-compliance/, Nov. 22, 2021, 8 Pages.

Vice, et al., "Implementing VPN Split Tunneling for Microsoft 365", Retrieved from: https://docs.microsoft.com/en-us/microsoft-365/enterprise/microsoft-365-vpn-implement-split-tunnel?view=o365-worldwide#common-vpn-scenarios, Mar. 4, 2022, 8 Pages.

"Get-SmbConnection", Retrieved from: https://docs.microsoft.com/en-us/powershell/module/smbshare/get-smbconnection?view-windowsserver2022-ps, Retrieved On: Aug. 21, 2022 , 3 Pages.

"Application as Filed in U.S. Appl. No. 17/720,133", filed Apr. 13, 2022, 31 Pages.

"International Search Report and Written Opinion Issued in PCT Application No. PCT/US2023/023309", Mailed Date: Sep. 15, 2023, 15 Pages.

Notice of Allowance mailed on Aug. 28, 2024, in U.S. Appl. No. 17/816,381, 07 pages.

Non-Final Office Action mailed on Apr. 22, 2024, in U.S. Appl. No. 17/816,381, 21 pages.

* cited by examiner

USING A REQUESTOR IDENTITY TO ENFORCE A SECURITY POLICY ON A NETWORK CONNECTION THAT CONFORMS TO A SHARED-ACCESS COMMUNICATION PROTOCOL

BACKGROUND

A shared-access communication protocol is a communication protocol that is configured to provide shared access to network resources, such as shared files and shared printers. Examples of a shared-access communication protocol include but are not limited to the Sever Message Block™ (SMB) communication protocol developed by Microsoft Corporation; the Apple Filing Protocol™ (AFP) communication protocol developed by Apple Inc.; the Network File System™ (NFS) communication protocol originally developed by Sun Microsystems, Inc., which has been acquired by Oracle Corporation; and the NetWare Core Protocol™ (NCP) and Service Advertising Protocol™ (SAP) communication protocols developed by Novell, Inc. In some operating system environments, it traditionally is not possible to associate a network connection that conforms to a shared-access communication protocol with the identity of an entity that is associated with a request to access the network connection. Without associating the network connection with the identity of the entity associated with the request, it may not be possible to enforce a security policy on the network connection.

SUMMARY

Various approaches are described herein for, among other things, using a requestor identity to enforce a security policy on a network connection that conforms to a shared-access communication protocol. The requestor identity identifies a requesting entity associated with a request that requests creation of the network connection. A network connection is a connection between a computing system and a network resource. Examples of a requesting entity include but are not limited to a user, an application, and a process. A network resource is a resource that is accessible using a shared-access communication protocol. It will be recognized that access to the network resource may be conditional based on one or more criteria being satisfied. For instance, granting of access to the network resource may require authentication and/or authorization of a requesting entity that is associated with a request to create a connection to the network resource. The network resource may be local to a machine from which the request is received or remote from the machine from which the request is received. Examples of a network resource include but are not limited to a device (e.g., a storage device or a printer) and information (e.g., a computer program or data). For instance, the data may be configured as a file.

In an example approach, a request is received. The request requests creation of a network connection between a computing system and a target network resource. The network connection conforms to a communication protocol that is configured to provide shared access to network resources. The network connection is associated with a requestor identity, which identifies a requesting entity associated with the request, by associating the request with the requestor identity and further by associating the network connection with the request. A determination is made whether the requesting entity is authorized to access the target network resource based at least in part on a permission that is indicated by a security policy. Based at least in part on the permission indicating that the requesting entity is authorized to access the target network resource, the network connection is created between the computing system and the target network resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
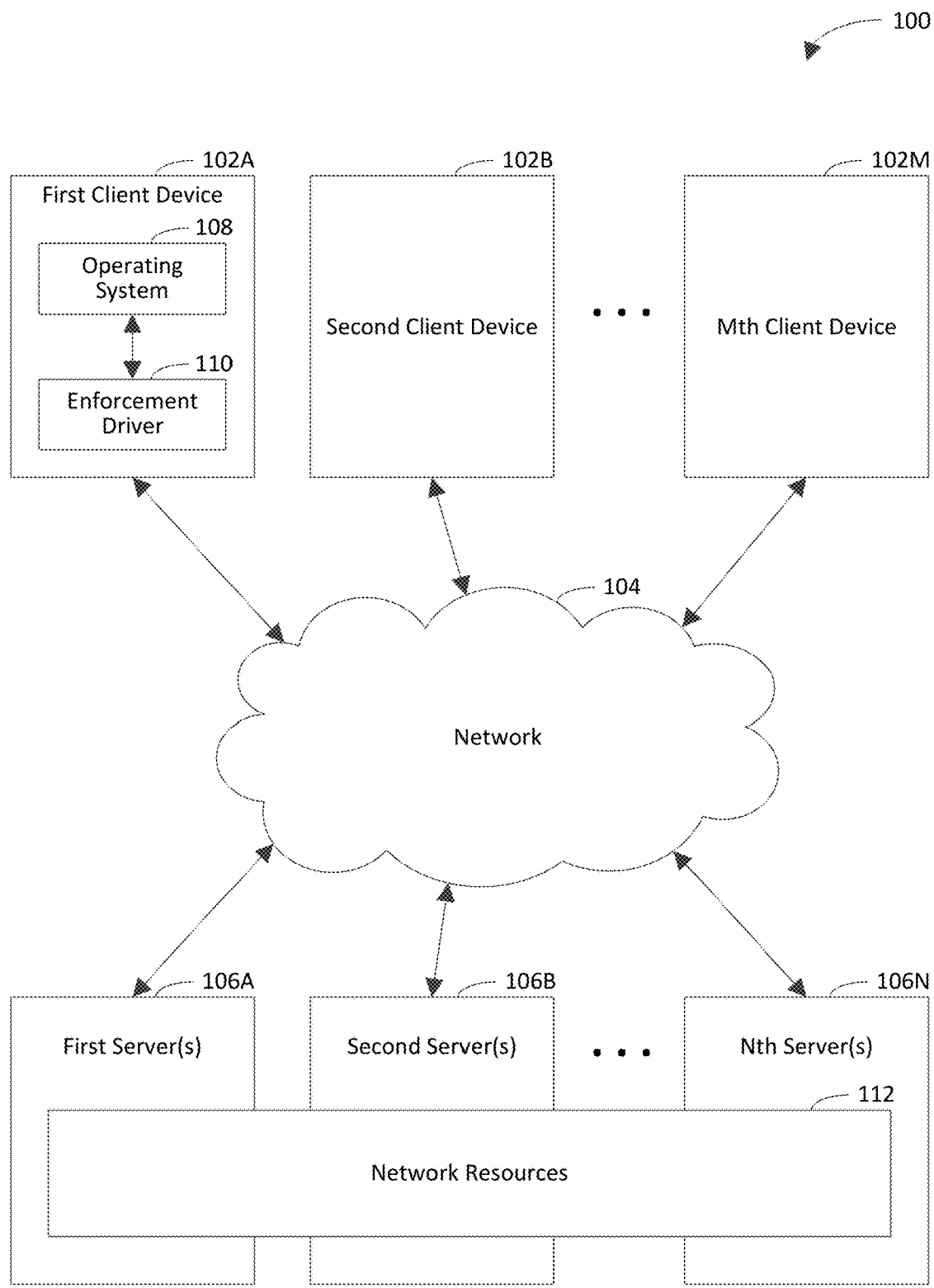
FIG. 1 is a block diagram of an example identity-based shared-access system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using a requestor identity to enforce a security policy on a network connection that conforms to a shared-access communication protocol. The requestor identity identifies a requesting entity associated with a request that requests creation of the network connection. A network connection is a connection between a computing system and a network resource. Examples of a requesting entity include but are not limited to a user, an application, and a process. A network resource is a resource that is accessible using a shared-access communication protocol. It will be recognized that access to the network resource may be conditional based on one or more criteria being satisfied. For instance, granting of access to the network resource may require authentication and/or authorization of a requesting entity that is associated with a request to create a connection to the network resource. The network resource may be local to a machine from which the request is received or remote from the machine from which the request is received. Examples of a network resource include but are not limited to a device (e.g., a storage device or a printer) and information (e.g., a computer program or data). For instance, the data may be configured as a file.

Example techniques described herein have a variety of benefits as compared to conventional techniques for creating a network connection that conforms to a shared-access communication protocol. For instance, the example techniques are capable of increasing security of the network connection and/or a network resource to which the network connection is created. The example techniques are capable of associating the network connection with the identity of a requesting entity that is associated with a request to create the network connection. For instance, the requesting entity may be the entity from which the request is received. The example techniques are capable of authenticating the requesting entity prior to creation of the network connection. The example techniques may maintain a context of the requesting entity when the network connection is created. For instance, the example techniques may prevent a user who logs into a system from accessing a network resource using a credential of another user. Associating the network connection with the identity of the requesting entity may enable the example techniques to enforce a security policy on the network connection. Enforcing the security policy on the network connection may prevent the requesting entity from accessing the network resource or limit the circumstances under which the requesting entity is allowed to access the network resource.

The example techniques may reduce an amount of time and/or resources (e.g., processor cycles, memory, network bandwidth) that is consumed to authenticate a requesting entity in order to create a network connection that conforms to a shared-access communication protocol. For instance, by associating the network connection with the identity of the requesting entity prior to creation of the network connection, the example techniques may eliminate a need to request a credential from the requesting entity, wait for receipt of the credential from the requesting entity, and compare the credential to a reference credential to authenticate the requesting entity prior to creation of the network connection. Even if the credential were requested from the requesting entity to authenticate the user prior to creation of the network connection, the association of the network connection with the identity of the requesting entity provides an additional factor in a multifactor authentication technique.

By reducing the amount of time and/or resources that is consumed to authenticate a requesting entity, the example techniques may increase efficiency of a computing system that is used to authenticate the requesting entity. If the requesting entity is a user, the example techniques may increase an efficiency and/or user experience of the user by eliminating a need for the user to provide a credential in order to authenticate or reducing a number of factors of a multifactor authentication technique that require interaction of the user.

FIG. 1 is a block diagram of an example identity-based shared-access system 100 in accordance with an embodiment. Generally speaking, the identity-based shared-access system 100 operates to provide information to requesting entities in response to requests (e.g., hypertext transfer protocol (HTTP) requests) that are received from the requesting entities. The requests may be initiated by any of a variety of requesting entities associated with the computing devices 102A-102M, including but not limited to users of the client devices 102A-102M, applications that execute on the client devices 102A-102M, and/or processes that execute on the client devices 102-102M. In various embodiments, the information includes documents (e.g., Web pages, images, audio files, and video files), output of executables, and/or any other suitable type of information. In accordance with example embodiments described herein, the identity-based shared-access system 100 uses a requestor identity, which identifies a requesting entity, to enforce a security policy on a network connection that conforms to a shared-access communication protocol. Detail regarding techniques for using a requestor identity to enforce a security policy on a network connection that conforms to a shared-access communication protocol is provided in the following discussion.

As shown in FIG. 1, the identity-based shared-access system 100 includes a plurality of client devices 102A-102M, a network 104, and a plurality of servers 106A-106N. Communication among the client devices 102A-102M and the servers 106A-106N is carried out over the network 104 using well-known network communication protocols. The network 104 may be a wide-area network (e.g., the Internet), a local area network (LAN), another type of network, or a combination thereof.

The client devices 102A-102M are computing systems that are capable of communicating with the servers 106A-106N. A computing system is a system that includes a processing system comprising at least one processor that is capable of manipulating data in accordance with a set of instructions. For instance, a computing system may be a computer or a personal digital assistant. The client devices 102A-102M are configured to provide requests to the servers 106A-106N for requesting information stored on (or otherwise accessible via) the servers 106A-106N.

In embodiments in which the requesting entity is a user, the user may initiate a request for executing a computer program (e.g., an application) using a client (e.g., a Web browser, Web crawler, or other type of client) deployed on a client device 102 that is owned by or otherwise accessible to the user. In accordance with some example embodiments, the client devices 102A-102M are capable of accessing domains (e.g., Web sites) hosted by the servers 104A-104N, so that the client devices 102A-102M may access information that is available via the domains. Such domain may include Web pages, which may be provided as hypertext markup language (HTML) documents and objects (e.g., files) that are linked therein, for example.

The first client device 102A is shown to include an operating system 108 and an enforcement driver 110 for illustrative purposes. The operating system 110 performs operations, which may include managing computer hardware and software resources and providing services for computer programs on the first computing device 102A. In some example embodiments, the operating system 110 registers the enforcement driver 110 to handle designated types of requests (e.g., file creation requests). When a request for a network resource (e.g., any of network resources 112) is received by the operating system 110, the operating system 110 may determine whether the shared-access communication protocol is to be used to access the network resource. The operating system 110 may forward the request to the enforcement driver 110 and indicate to the enforcement driver 110 whether the shared-access communication protocol is to be used to access the network resource. It should be noted that if a shared-access communication protocol is to be used to access a network resource, a request to access the network resource constitutes a request to create a network connection, which conforms to the shared-access communication protocol, to the network resource. Examples of an operating system include Berkeley Software Distribution™ (BSD), developed and distributed by the Computer Systems Research Group (CSRG) of the University of California, Berkeley, or descendants thereof, Linux developed and distributed under the GNU Project; iOS™ developed and distributed by Apple Inc.; Microsoft Windows® developed and distributed by Microsoft Corporation; and UNIX™ developed and distributed by AT&T.

The enforcement driver 110 is configured to process requests to access any one or more network resources 112. For instance, the enforcement driver 110 may receive the requests from the operating system 108. In example embodiments described herein, for each of the requests that constitutes a request to create a network connection that conforms to the shared-access communication protocol, the enforcement driver 110 identifies a requestor identity associated with the network connection and uses the requestor identity to enforce a security policy on the network connection. In an example implementation, the enforcement driver 110 receives a request that requests creation of a network connection between the first client device 102A and a target network resource, which is included in the network resources 112. The network connection conforms to the shared-access communication protocol, which is configured to provide shared access to the network resources 112. The enforcement driver 110 associates the network connection with a requestor identity, which identifies a requesting entity associated with the request, by associating the request with the requestor identity and further by associating the network connection with the request. The enforcement driver 110 determines whether the requesting entity is authorized to access the target network resource based at least in part on a permission that is indicated by a security policy. Based at least in part on the permission indicating that the requesting entity is authorized to access the target network resource, the enforcement driver 110 creates the network connection between the first client device 102A and the target network resource.

Each of the client devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the client devices 102A-102M may communicate with any one or more of the servers 106A-106N.

The servers 106A-106N are computing systems that are capable of communicating with the client devices 102A-102M. The servers 106A-106N are configured to execute computer programs that provide information to requesting entities in response to receiving requests from the requesting entities. For example, the information may include documents (Web pages, images, audio files, video files, etc.), output of executables, or any other suitable type of information. In accordance with some example embodiments, the servers 106A-106N are configured to host respective Web sites, so that the Web sites are accessible to requesting entities of the identity-based shared-access system 100. The servers 106A-106N include the network resources 112. For instance, the network resources 112 may be distributed among the servers 106A-106N, though it will be recognized that any of the network resources 112 may be included in a single server. The servers 106A-106N are configured to provide access to the network resources 112 via network connections that are created by the client devices 102A-102M. For instance, when the enforcement driver 110 in the first client device 102A creates a network connection to a target network resource, the server(s) that include the target network resource provide access to the target network resource via the network connection.

The operating system 108 and/or the enforcement driver 110 may be implemented in various ways to use a requestor identity to enforce a security policy on a network connection that conforms to a shared-access communication protocol, including being implemented in hardware, software, firmware, or any combination thereof. For example, the operating system 108 and/or the enforcement driver 110 may be implemented as computer program code configured to be executed in one or more processors. In another example, at least a portion of the operating system 108 and/or the enforcement driver 110 may be implemented as hardware logic/electrical circuitry. For instance, at least a portion of the operating system 108 and/or the enforcement driver 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions. Each of the network resources 112 also may be implemented in hardware, software, firmware, or any combination thereof.

It will be recognized that each of the client devices 102A-102M may include an operating system and an enforcement driver that are configured to operate as described above with regard to the operating system 108 and the enforcement driver 110 in the first client device 102A.

FIG. 2-5 depict flowcharts 200, 300, 400, and 500 of example methods for using a requestor identity to enforce a security policy on a network connection that conforms to a shared-access communication protocol in accordance with embodiments. Flowcharts 200, 300, 400, and 500 may be performed by the first client device 102A shown in FIG. 1, for example. For illustrative purposes, flowcharts 200, 300, 400, and 500 are described with respect to computing system 600 shown in FIG. 6, which is an example implementation of the first client device 102A. As shown in FIG. 6, the computing system 600 includes an enforcement driver 610 and a store 620. The enforcement driver 610 includes identity-based association logic 612, security logic 614, connection creation logic 616, and interface logic 618. The identity-based association logic 612 includes first association logic 622, second association logic 624, and throttling logic 626. The security logic 614 includes authentication logic 628 and authorization logic 630. The store 620 may be any suitable type of store. One type of store is a database. For instance, the store 620 may be a relational database, an entity-relationship database, an object database, an object relational database, an extensible markup language (XML) database, etc. The store 620 is shown to store a security policy 638 and access information 640 for non-limiting, illustrative purposes. Further structural and operational embodiments will be apparent to persons skilled in the relevant art(s) based on the discussion regarding flowcharts 200, 300, 400, and 500.

Figure 2:
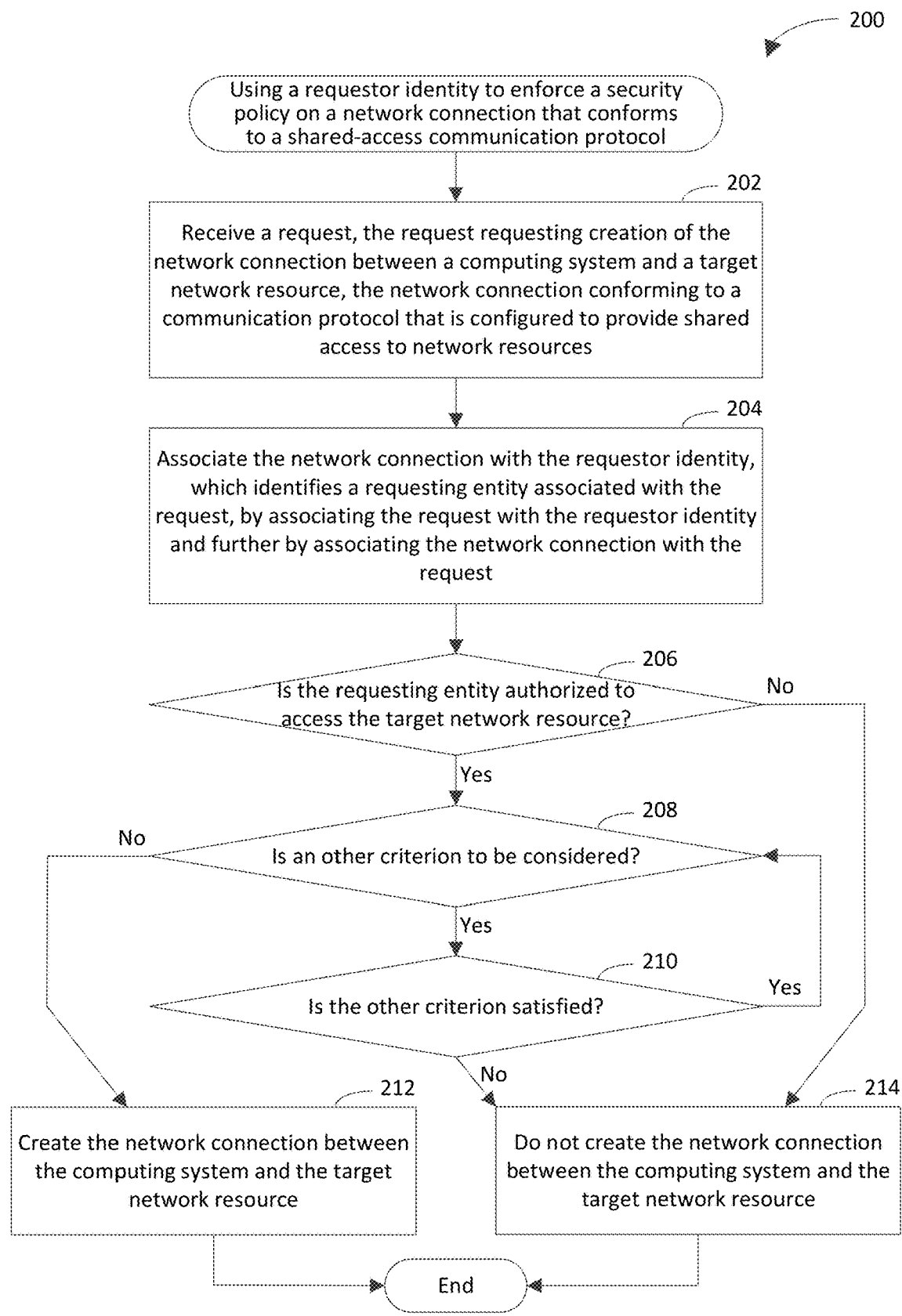
FIGS. 2-5 depict flowcharts of example methods for using a requestor identity to enforce a security policy on a network connection that conforms to a shared-access communication protocol in accordance with embodiments.

As shown in FIG. 2, the method of flowchart 200 begins at step 202. In step 202, a request is received. The request requests creation of the network connection between the computing system and a target network resource. The network connection conforms to a communication protocol that is configured to provide shared access to network resources (e.g., network resources 112 shown in FIG. 1). In an example implementation, the identity-based association logic 612 receives a network connection request 632. The network connection request 632 requests creation of a network connection 644 between the computing system 600 and the target network resource.

At step 204, the network connection is associated with the requestor identity, which identifies a requesting entity associated with the request, by associating the request with the requestor identity and further by associating the network connection with the request. In an example implementation, the identity-based association logic 612 associates the network connection 644 with the requestor identity. In accordance with this implementation, the requestor identity identifies the requesting entity associated with the network connection request 632. In further accordance with this implementation, the first association logic 622 associates the network connection request 632 with the requestor identity. In further accordance with this implementation, the second association logic 624 associates the network connection 644 with the network connection request 632. The identity-based association logic 612 may generate identity information 634 to indicate the association between the network connection 644 and the requestor identity.

In example embodiments, associating the network connection with the requestor identity at step 204 increases security of the network connection and/or the target network resource. For instance, step 204 may enable the requesting entity to be authenticated prior to creation of the network connection. Step 204 may enable a context of the requesting entity to be maintained if or when the network connection is ultimately created.

In example embodiments, associating the network connection with the requestor identity at step 204 reduces an amount of time and/or resources (e.g., processor cycles, memory, network bandwidth) that is consumed to authenticate the requesting entity in order to create the network connection. Step 204 may therefore increase efficiency of the computing system.

In example embodiments, associating the network connection with the requestor identity at step 204 increases efficiency of the requesting entity and/or quality of the user experience (e.g., by eliminating a need to request a credential from the requesting entity, wait for receipt of the credential from the requesting entity, and compare the credential to a reference credential to authenticate the requesting entity prior to creation of the network connection).

At step 206, a determination is made whether the requesting entity is authorized to access the target network resource based at least in part on a permission that is indicated by the security policy. In an example implementation, the authorization logic 630 determines whether the requesting entity is authorized to access the target network resource. In accordance with this implementation, the authorization logic 630 analyzes the identity information 634 to determine the requestor identity that is associated with the network connection 644. In further accordance with this implementation, the authorization logic 630 retrieves the security policy 638 from the store 620 and analyzes the security policy 638 to determine the permission indicated by the security policy 638. For instance, the security policy 638 may include multiple permissions cross-referenced with respective identities, indicating that the permissions are to be applied with regard to the respective identities. The authorization logic 630 may cross-reference the requestor identity that is indicated by the identity information 634 with the permissions in the security policy 638 to identify the permission on which the determination at step 206 is based. The security logic 614 may generate a connection creation instruction 636 to indicate whether the network connection 644 is to be created between the computing system 600 and the target network resource.

The security logic 614 may take into consideration any of a variety of factors to determine whether the network connection 644 is to be created. The security logic 614 takes into consideration at least whether the requesting entity is authorized to access the target network resource to determine whether the network connection 644 is to be created. For instance, the requesting entity being authorized to access the target network resource weighs in favor of instructing the connection creation logic 616 to create the network connection 644, whereas the requesting entity not being authorized to access the target network resource weighs against instructing the connection creation logic 616 to create the network connection 644. The security logic 614 may generate the connection creation instruction 636 to include a first value (e.g., "1") if the network connection 644 is to be created. The security logic 614 may generate the connection creation instruction 636 to include a second value (e.g., "0"), which is different from the first value, if the network connection 644 is not to be created. If the requesting entity is authorized to access the target network resource, flow continues to step 208. Otherwise, flow continues to step 214.

In example embodiments, determining whether the requesting entity is authorized to access the target network resource at step 206 increases security of the network connection and/or the network resource.

At step 208, a determination is made whether another criterion is to be considered with regard to whether the network connection is to be created. In an example implementation, the security logic 614 determines whether another criterion is to be considered. If another criterion is to be considered, flow continues to step 210. Otherwise, flow continues to step 212.

At step 210 a determination is made whether the criterion is satisfied. In an example implementation, the security logic 614 determines whether the criterion is satisfied. For example, if the criterion pertains to authentication, the authentication logic 628 may determine whether the criterion is satisfied. In another example, if the criterion pertains to authorization, the authorization logic 630 may determine whether the criterion is satisfied. If the criterion is satisfied, flow returns to step 208. Otherwise, flow continues to step 214.

It will be recognized that the security logic 614 takes into consideration whether any other criteria, as determined at step 208, are satisfied, as determined at step 210, to determine whether the network connection 644 is to be created between the computing system 600 and the target network resource. If the criteria are satisfied, the security logic 614 configures the connection creation instruction 636 to indicate that the network connection 644 is to be created. If any of the criteria are not satisfied, the security logic 614 configures the connection creation instruction 636 to indicate that the network connection 644 is not to be created.

At step 212, the network connection is created between the computing system and the target network resource. In an example implementation, the connection creation logic 616 creates the network connection 644 between the computing system 600 and the target network resource based on the connection creation instruction 636 indicating that the network connection 644 is to be created (e.g., based on the connection creation instruction 636 including the first value). Upon completion of step 212, flowchart 200 ends.

In an example embodiment, the security policy includes a preference associated with the requesting entity. The preference indicates that the network connection is to be created through a specified path. In accordance with this embodiment, the network connection is created at step 212 through the specified path, which is selected from multiple paths based at least in part on the preference. For example, the paths may include (e.g., be) respective network drivers. In accordance with this example, the paths may include a Wi-Fi driver and a cable driver.

At step 214, the network connection is not created between the computing system and the target network resource. In an example implementation, the connection creation logic 616 does not create the network connection 644 between the computing system 600 and the target network resource based on the connection creation instruction 636 indicating that the connection is not to be created (e.g., based on the connection creation instruction 636 including the second value). Upon completion of step 214, flowchart 200 ends.

In example embodiments, not creating the network connection between the computing system and the target network resource at step 214 increases security of the network resource.

In some example embodiments, one or more steps 202, 204, 206, 208, 210, 212, and/or 214 of flowchart 200 are not performed. Moreover, steps in addition to or in lieu of steps 202, 204, 206, 208, 210, 212, and/or 214 may be performed. For instance, in an example embodiment, the request that is received at step 202 includes a file open request, which requests to open a file. For example, the network connection request 632 may include the file open request. In accordance with this embodiment, the target network resource includes the file. In further accordance with this embodiment, creating the network connection at step 212 includes enabling the requesting entity to open the file. In an aspect of this embodiment, the method of flowchart 200 further includes, based at least in part on the request including a double-backslash, determining that the request includes the file open request. The double-backslash is defined by two consecutive backslash characters (e.g., at a beginning of a path that indicates a location of the target network resource). In an example implementation, the security logic 614 determines that the network connection request 632 includes the file open request. For instance, the security logic 614 may analyze the network connection request 632 to identify the double-backslash therein. In accordance with this implementation, the security logic 614 may configure the connection creation instruction 636 to indicate that the file is to be opened.

In another example embodiment, the method of flowchart 200 further includes receiving a protocol use indicator from an operating system that runs on the computing system. The protocol use indicator specifies that the communication protocol is to be used to access the target network resource. In an example implementation the identity-based association logic 612 and/or the security logic 614 may receive the protocol use indicator form an operating system that executes on the computing system 600. For example, the operating system may forward the network connection request 632 to the enforcement driver 610, and the network connection request 632 may include the protocol use indicator. In another example, the enforcement driver 610 may receive the protocol use indicator separately from the network connection request 632. In both of these examples, the security logic 614 may generate the connection creation instruction 636 based on receipt of the protocol use indicator.

In yet another example embodiment, the method of flowchart 200 further includes throttling (e.g., holding or delaying) requests that request access to the network resources such that the requests are processed one-at-a-time. The requests include the request that requests creation of the network connection between the computing system and the target network resource. In an example implementation, the throttling logic 626 throttles the requests, which include the network connection request 632.

Figure 3:
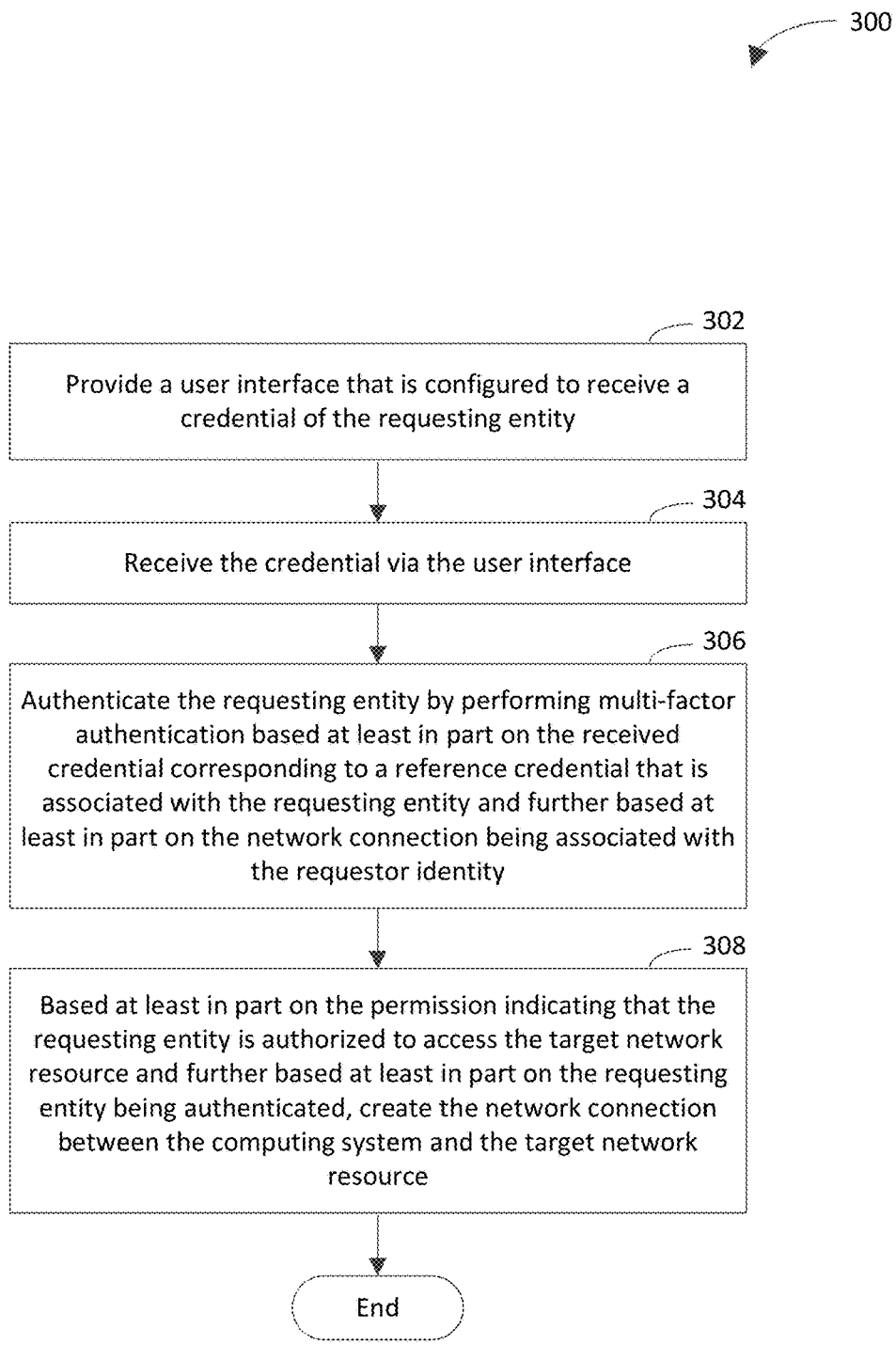

In still another example embodiment, the method of flowchart 200 includes one or more of the steps shown in flowchart 300 of FIG. 3. As shown in FIG. 3, the method of flowchart 300 begins at step 302. In step 302, a user interface that is configured to receive a credential of the requesting entity is provided. In an example implementation, the interface logic 618 provides a user interface 646, which is configured to receive a credential 642 of the requesting entity.

At step 304, the credential is received via the user interface. In an example implementation, the authentication logic 628 receives the credential 642 via the user interface.

At step 306, the requesting entity is authenticated by performing multi-factor authentication based at least in part on the received credential corresponding to a reference credential that is associated with the requesting entity and further based at least in part on the network connection being associated with the requestor identity. In an example implementation, the authentication logic 628 authenticates the requesting entity by performing the multi-factor authentication based at least in part on the credential 642 corresponding to the reference credential and further based at least in part on the network connection 644 being associated with the requestor identity. The security logic 614 may configure the connection creation logic 616 to indicate that the network connection 644 is to be created based at least in part on the requesting entity being authenticated.

At step 308, based at least in part on the permission indicating that the requesting entity is authorized to access the target network resource and further based at least in part on the requesting entity being authenticated, the network connection is created between the computing system and the target network resource. In an example implementation, the connection creation logic 616 creates the network connection 644 between the computing system 600 and the target network resource based on the connection creation instruction 636 indicating that the network connection 644 is to be created. It will be recognized that step 308 may be included in step 212 of flowchart 200.

Figure 4:
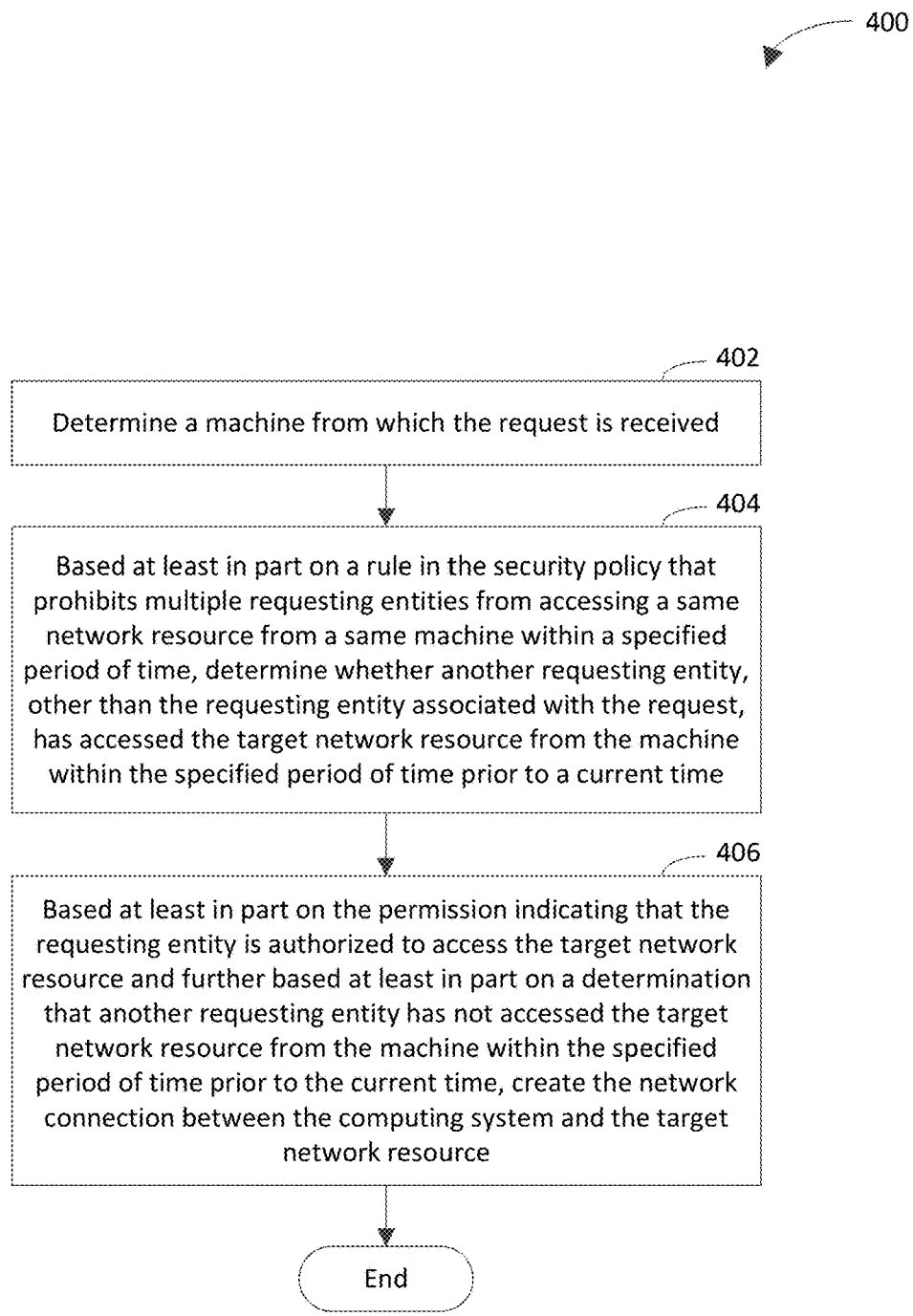

In another example embodiment, the method of flowchart 200 further includes one or more of the steps shown in flowchart 400 of FIG. 4. In accordance with this embodiment, the security policy includes a rule that prohibits multiple requesting entities from accessing a same network resource from a same machine within a specified period of time. For instance, the security policy 638 may include the rule. As shown in FIG. 4, the method of flowchart 400 begins at step 402. In step 402, a machine from which the request is received is determined. In an example implementation, the security logic 614 determines the machine from which the network connection request 632 is received. For instance, the network connection request 632 may include an identifier associated with the machine, and the security logic 614 may determine the machine based on the identifier. For example, the identifier may uniquely identify the machine.

A step 404, based at least in part on the rule, a determination is made whether another requesting entity, other than the requesting entity associated with the request, has accessed the target network resource from the machine within the specified period of time prior to a current time. In an example implementation, the security logic 614 makes the determination. For example, the access information 640 may indicate network resources that are (and/or have been) available to be accessed. The access information 640 may further indicate which requesting entities have accessed each of the network resources and a time at which each access occurred. For instance, each time may indicate a day, hour, minute, and/or second at which the respective access occurred. In accordance with this example, the security logic 614 may identify the target network resource in the access information 640 and check which of the requesting entities, other than the requesting entity associated with the network connection request 632, has accessed the target network resource and a time at which each such access occurred. The security logic 614 may compare the time at which each access occurred to the specified period of time to determine whether each time is included in the specified period of time. If at least one of the times is included in the specified period of time, the security logic 614 determines that another requesting entity, other than the requesting entity associated with the network connection request 632, has accessed the target network resource from the machine within the specified period of time prior to the current time. Otherwise, the security logic 614 determines that no other requesting entity has accessed the target network resource from the machine within the specified period of time prior to the current time.

The security logic 614 may generate the connection creation instruction 636, indicating whether the network connection 644 is to be created, based at least in part on whether another requesting entity, other than the requesting entity associated with the network connection request 632, has accessed the target network resource from the machine within the specified period of time prior to the current time. Another requesting entity satisfying this condition weighs against instructing the connection creation logic 616 to create the network connection 644, whereas no other requesting entity satisfying this condition weighs in favor of instructing the connection creation logic 616 to create the network connection 644.

At step 406, based at least in part on the permission indicating that the requesting entity is authorized to access the target network resource and further based at least in part on a determination that another requesting entity has not accessed the target network resource from the machine within the specified period of time prior to the current time, the network connection is created between the computing system and the target network resource. In an example implementation, the connection creation logic 616 creates the network connection 644 between the computing system 600 and the target network resource based on the connection creation instruction 636 indicating that the network connection 644 is to be created. It will be recognized that step 406 may be included in step 212 of flowchart 200.

Figure 5:
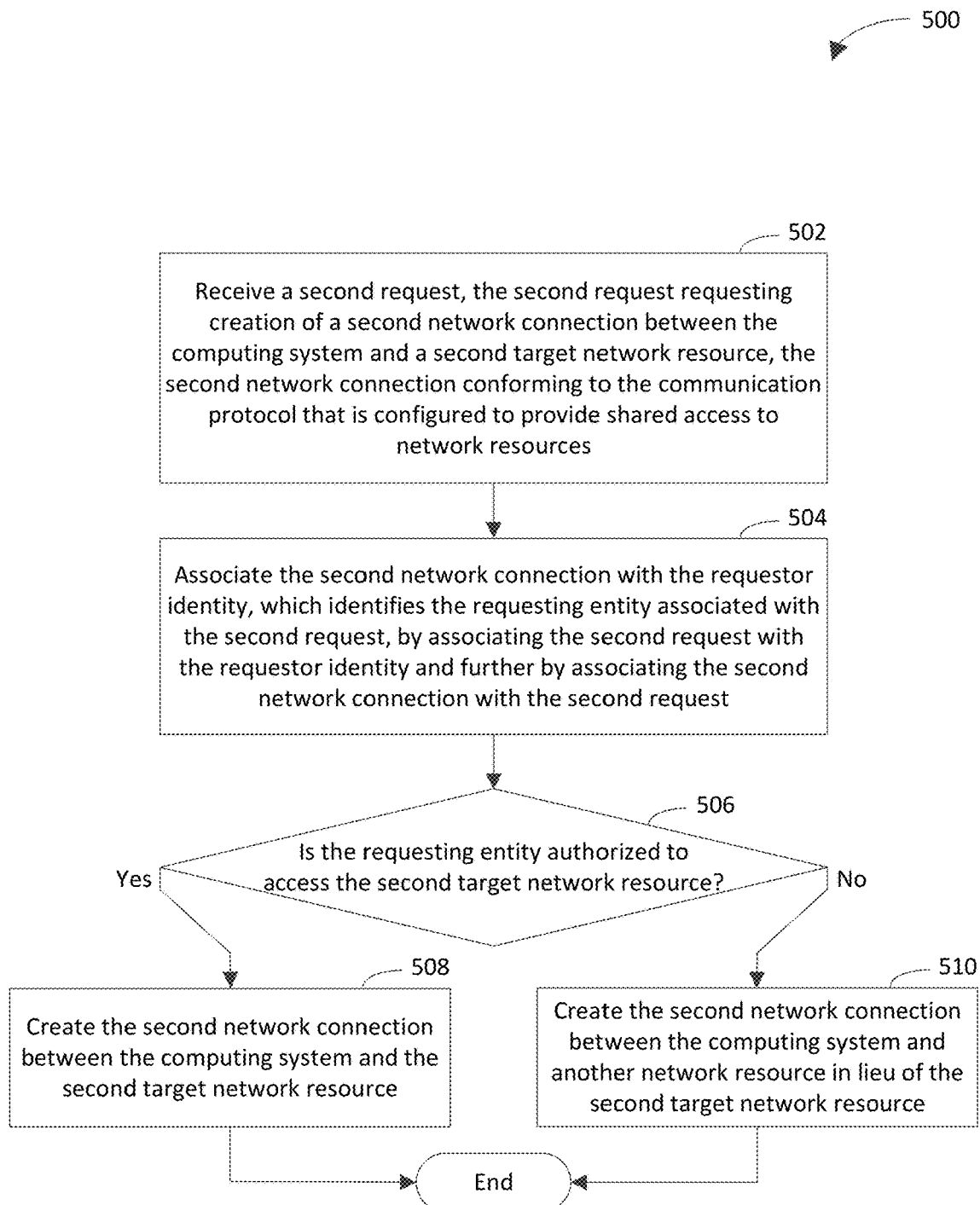
Figure 6:
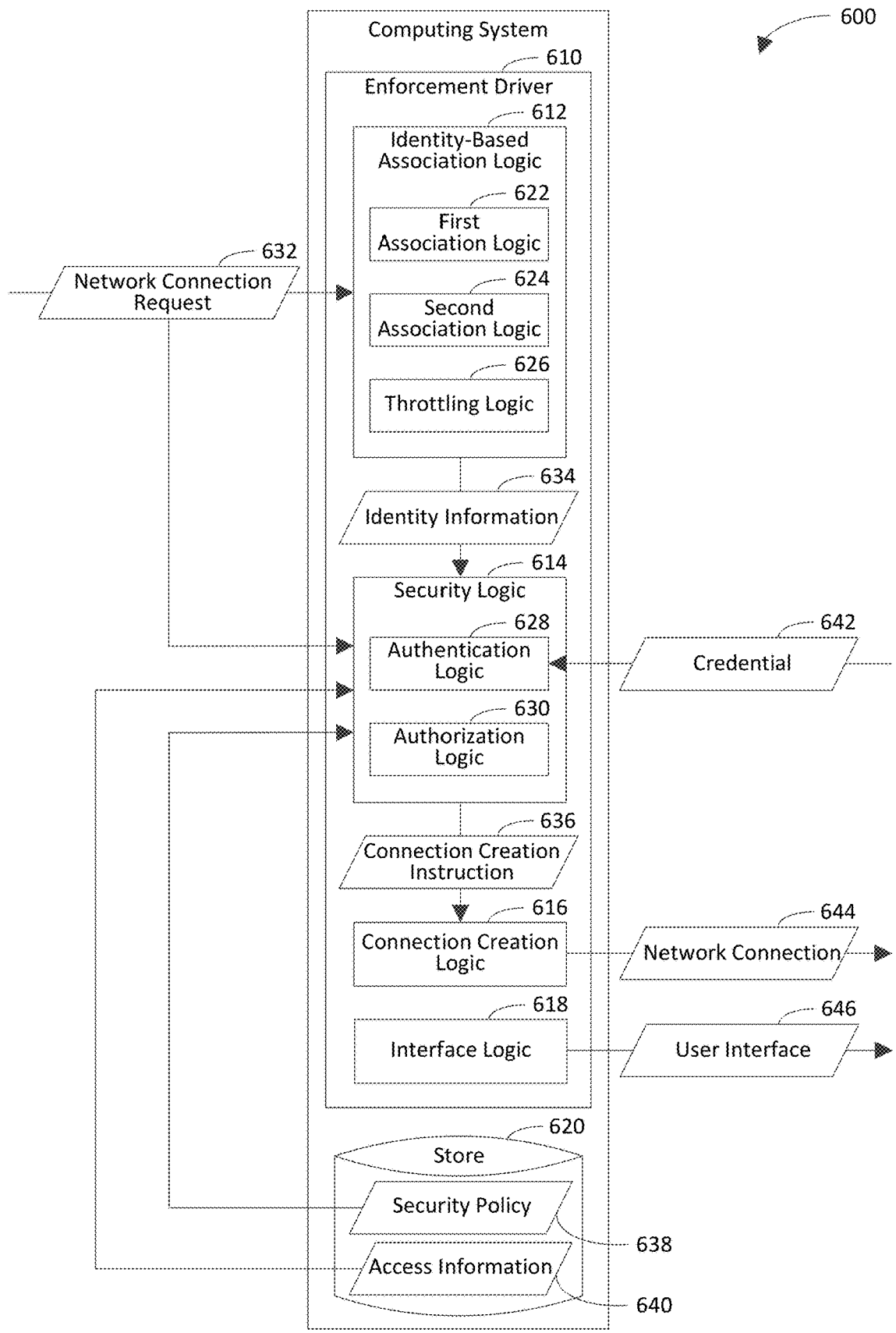
FIG. 6 is a block diagram of an example computing system in accordance with an embodiment.

In yet another example embodiment, the method of flowchart 200 includes one or more of the steps shown in flowchart 500 of FIG. 5. As shown in FIG. 5, the method of flowchart 500 begins at step 502. In step 502, a second request is received. The second request requests creation of a second network connection between the computing system and a second target network resource. The second network connection conforms to the communication protocol that is configured to provide shared access to network resources. In an example implementation, the identity-based association logic 612 receives the second request, which requests creation of the second network connection between the computing system 600 and the second target network resource.

At step 504, the second network connection is associated with the requestor identity, which identifies the requesting entity associated with the second request, by associating the second request with the requestor identity and further by associating the second network connection with the second request. In an example implementation, the identity-based association logic 612 associates the second network connection with the requestor identity. In accordance with this implementation, the first association logic 622 associates the second request with the requestor identity. In further accordance with this implementation, the second association logic 624 associates the second network connection with the second request. The identity-based association logic 612 may configure identity information 634 to indicate the association between the second network connection and the requestor identity.

At step 506, a determination is made whether the requesting entity is authorized to access the second target network resource based at least in part on a second permission that is indicated by the security policy. In an example implementation, the authorization logic 630 determines whether the requesting entity is authorized to access the second target network resource. In accordance with this implementation, the authorization logic 630 analyzes the identity information 634 to determine the requestor identity that is associated with the second network connection. In further accordance with this implementation, the authorization logic 630 analyzes the security policy 638 to determine the second permission indicated by the security policy 638. For instance, the security policy 638 may include multiple permissions cross-referenced with respective identities, indicating that the permissions are to be applied with regard to the respective identities. The authorization logic 630 may cross-reference the requestor identity that is indicated by the identity information 634 with the permissions in the security policy 638 to identify the second permission on which the determination at step 506 is based. The security logic 614 analyzes the second permission to determine whether the requesting entity is authorized to access the second target network resource.

The security logic 614 may take into consideration any of a variety of factors to make the determination. In the embodiment of FIG. 5, the determination takes into consideration a single factor, namely, whether the requesting entity is authorized to access the second target network resource, for non-limiting, illustrative purposes. Accordingly, if the requesting entity is authorized to access the second target network resource, the security logic 614 configures the connection creation instruction 636 to indicate that the second network connection is to be created between the computing system 600 and the second target network resource. If the requesting entity is not authorized to access the second target network resource, the security logic 614 configures the connection creation instruction 636 to indicate that the second network connection is not to be created between the computing system 600 and the second target network resource. If the requesting entity is authorized to access the second target network resource, flow continues to step 508. Otherwise, flow continues to step 510.

At step 508, the second network connection is created between the computing system and the second target network resource. In an example implementation, the connection creation logic 616 creates the second network connection between the computing system 600 and the second target network resource based on the connection creation instruction 636 indicating that the second network connection is to be created between the computing system 600 and the second target network resource. Upon completion of step 508, flowchart 500 ends.

At step 510, the second network connection is created between the computing system and another network resource in lieu of the second target network resource. In an example implementation, the connection creation logic 616 creates the second network connection between the computing system 600 and the other network resource, which is different from the second target network resource, based on the connection creation instruction 636 indicating that the second network connection is not to be created between the computing system 600 and the second target network resource. For example, the security logic 614 may configure the connection creation instruction 636 to indicate that the second network connection is to be created between the computing system 600 and the other network resource based on the requesting entity not being authorized to access the second target network resource. For instance, the security logic 614 may configure the connection creation instruction 636 in this manner further based on the requesting entity being authorized to access the other network resource (e.g., as indicated by the security policy 638). In accordance with this example, the connection creation logic 616 may create the second network connection between the computing system 600 and the other network resource based on the connection creation instruction 636 indicating that the second network connection is to be created between the computing system 600 and the other network resource. Upon completion of step 510, flowchart 500 ends.

It will be recognized that the computing system 600 may not include one or more of the enforcement driver 610, the identity-based association logic 612, the security logic 614, the connection creation logic 616, the interface logic 618, the store 620, the first association logic 622, the second association logic 624, the throttling logic 626, the authentication logic 628, and/or the authorization logic 630. Furthermore, the computing system 600 may include components in addition to or in lieu of the enforcement driver 610, the identity-based association logic 612, the security logic 614, the connection creation logic 616, the interface logic 618, the store 620, the first association logic 622, the second association logic 624, the throttling logic 626, the authentication logic 628, and/or the authorization logic 630.

Figure 7:
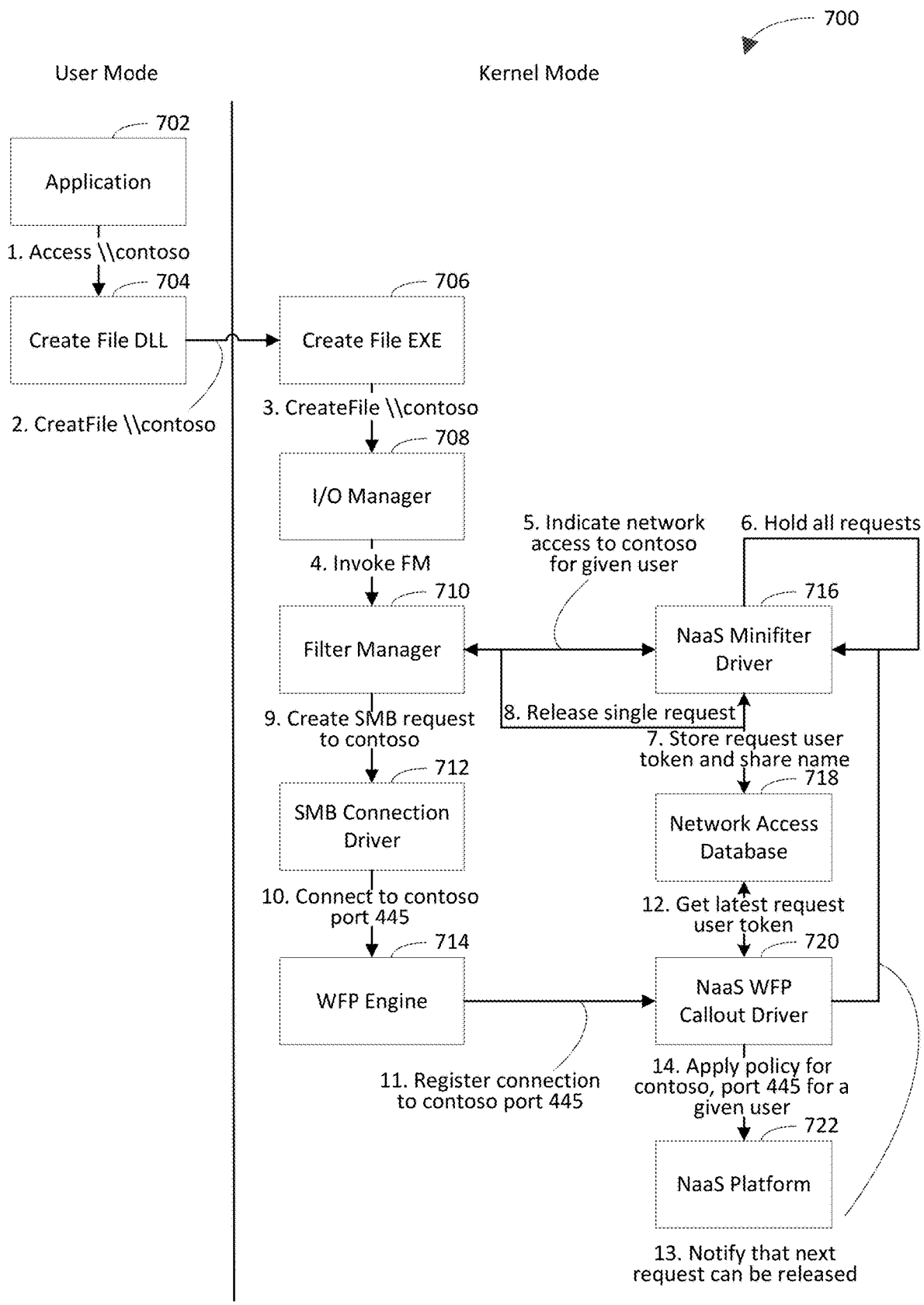
FIG. 7 is an example flow diagram of an example methods for using a requestor identity to enforce a security policy on a network connection that conforms to a server message block (SMB) communication protocol in accordance with an embodiment.

FIG. 7 is an example flow diagram 700 of an example method for using a requestor identity to enforce a security policy on a network connection that conforms to a server message block (SMB) communication protocol in accordance with an embodiment. The flow diagram 700 shows fourteen actions that are performed to enforce the security policy on the network connection. Actions 1 and 2 are performed in user mode. Actions 3 through 14 are performed in kernel mode.

In action 1, an application 702 provides a file operation request (e.g., a file open request), which requests creation of a network connection to a network resource named "contoso". By providing the file operation request, the application 702 calls a create file dynamic link library (DLL) 704 that is loaded into each process of an operating system in the user mode.

In action 2, the create file DLL 704 transfers the file operation request to a kernel mode execution context, referred to as the create file kernel module 706, to handle the transfer request.

In action 3, the create file kernel module 706 sends an input/output (I/O) request packet to an I/O manager 708.

In action 4, the I/O manager 708 calls the filter manager 710, which manages a network-as-a-service (NaaS) minifilter driver 716. It should be noted that the NaaS minifilter driver 716 is capable of being attached to an I/O stack. In an example implementation of this action, the I/O manager 708 invokes the filter manager 710 with FLT_FILE_NAME_INFORMATION.Share=contoso indicating a network access and TOKEN_USER with the associated information.

In action 5, the filter manager 710 invokes relevant handlers in the NaaS minifilter driver 716 and indicates network access to contoso for a given user.

In action 6, the NaaS minifilter driver 716 holds requests for file access to ensure that one request at a time is processed. The NaaS minifilter driver 716 therefore places the file operation request that is provided in action 1 in a queue to await processing.

In action 7, the NaaS minifilter driver 716 stores a request user token, which indicates the requestor identity that identifies the application 702, and a share name, which identifies contoso, in a network access database 718.

In action 8, the NaaS minifilter driver 716 releases a single request, which is the file operation request provided in action 1 in this example.

In action 9, based on the file system request being released, the filter manager 710 determines which driver is responsible for the correspondent shared access protocol-based file system, transfers the request to the SMB driver, creates an SMB request for contoso, and provides the SMB request to an SMB connection driver 712.

In action 10, the SMB connection driver 712 creates the network connection to contoso, port 445.

In action 11, a WFP engine 714 registers the network connection to contoso, port 445, with a NaaS Windows Filtering Platform (WFP) callout driver 720, which notifies the NaaS WFP callout driver 720 that the network connection has been created.

In action 12, the NaaS WFP callout driver 720 determines that the network connection conforms to the SMB communication protocol and obtains the user token associated with last released file operation request (i.e., the file operation request that is provided in action 1) from the network access database 718. By analyzing the user token, the NaaS WFP callout driver 720 determines the requestor identity of the application 702, which requested the network connection.

In action 13, the NaaS WFP callout driver 720 notifies the NaaS minifilter driver 716 that the next request can be released.

In action 14, the NaaS WFP callout driver 720 applies the security policy for contoso, port 445, for a given user, which enables a NaaS platform 722 to determine an action to be performed based on the security policy.

The combination of the SMB connection driver 712, the NaaS minifilter driver 716, and the NaaS WFP callout driver 720 form an example implementation of the enforcement driver 110 shown in FIG. 1 and the enforcement driver 610 shown in FIG. 6.

Figure 8A:
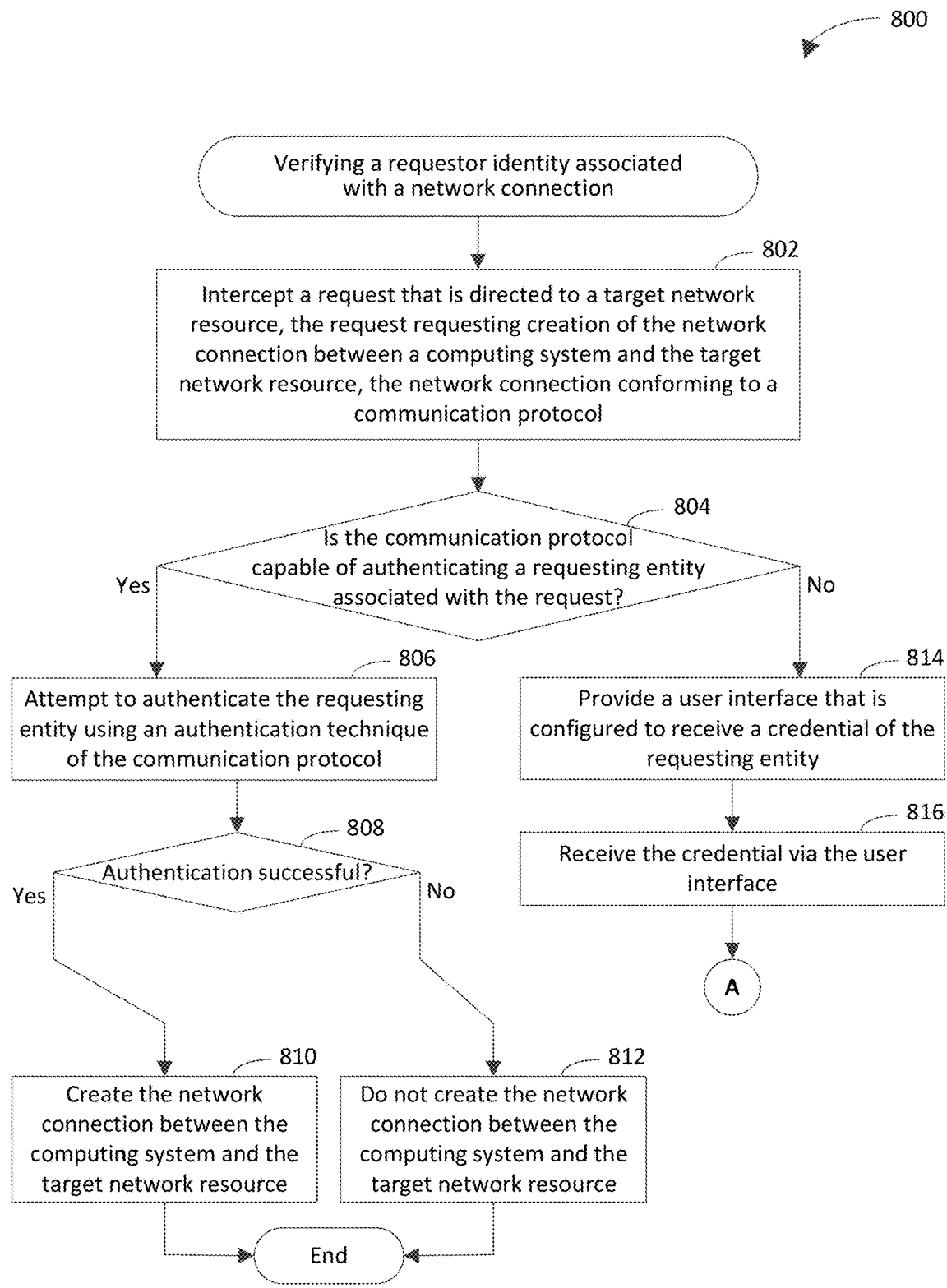
FIGS. 8A-8B depict respective portions of a flowchart of an example method for verifying a requestor identity associated with a network connection in accordance with an embodiment.
Figure 8B:
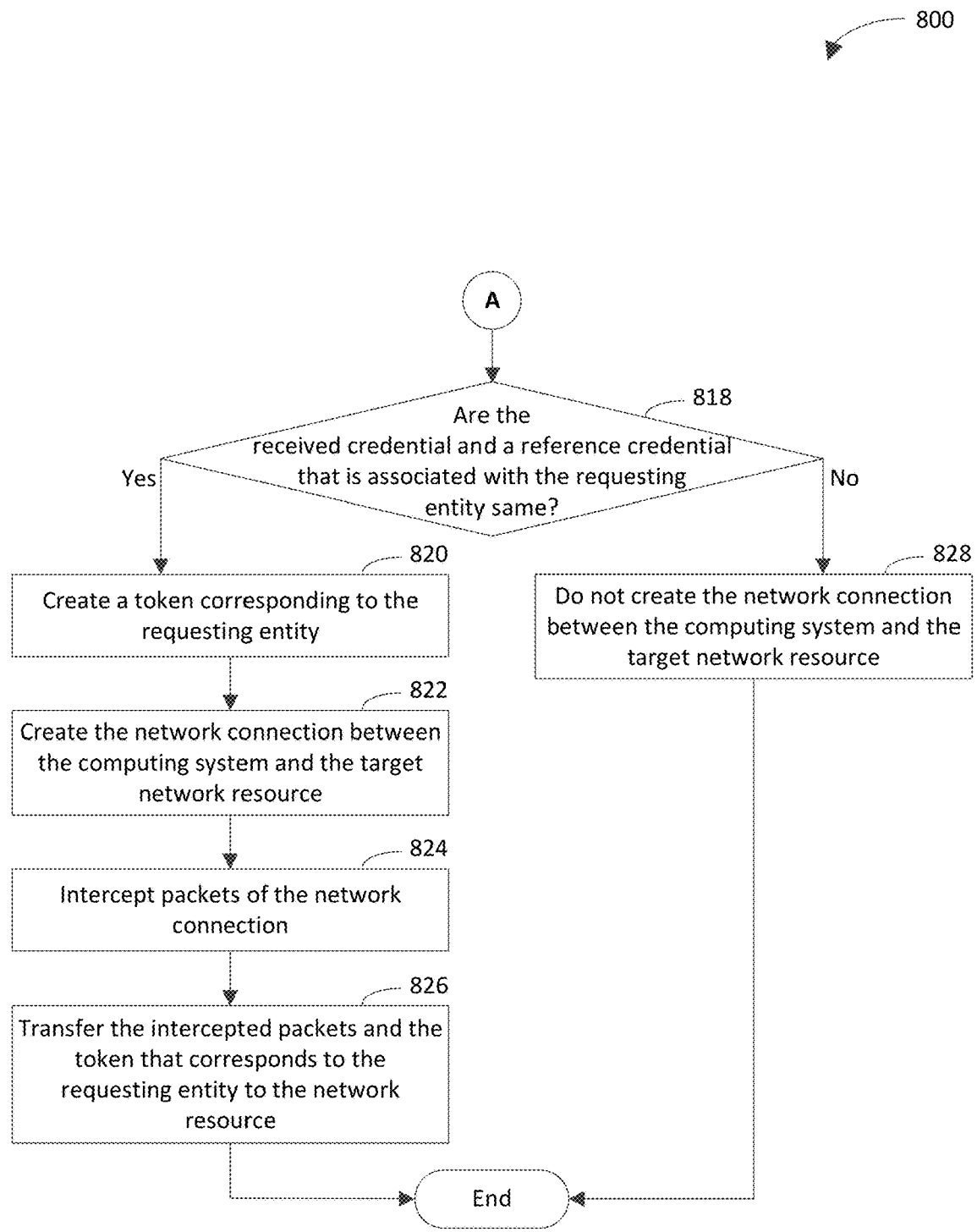

FIGS. 8A-8B depict respective portions of a flowchart 800 of an example method for verifying a requestor identity associated with a network connection in accordance with an embodiment. Flowchart 800 may be performed by the first client device 102A shown in FIG. 1, for example. For illustrative purposes, flowchart 800 is described with respect to computing system 600 shown in FIG. 6. Further structural and operational embodiments will be apparent to persons skilled in the relevant art(s) based on the discussion regarding flowchart 800.

As shown in FIG. 8A, the method of flowchart 800 begins at step 802. In step 802, a request that is directed to a target network resource is intercepted. The request requests creation of the network connection between a computing system and the target network resource. The network connection conforms to a communication protocol. In an example implementation, the security logic 614 intercepts a network connection request 632 that is directed to the target network resource. The network connection request 632 requests creation of the network connection between the computing system 600 and the target network resource. In another example implementation, the NaaS WFP callout driver 720 of FIG. 7 intercepts the network connection request 632.

At step 804, a determination is made whether the communication protocol is capable of authenticating a requesting entity associated with the request. One example of a communication protocol that is not capable of authenticating a requesting entity is a trivial file transfer Protocol™ (TFTP) communication protocol, which allows file upload and download without authentication. In an example implementation, the authentication logic 628 determines whether the communication protocol is capable of authenticating the requesting entity associated with the network connection request 632. In accordance with this implementation, the authentication logic 628 may be implemented in an identity management system, such as Microsoft® Azure® Active Directory® (e.g., using the Microsoft Authentication Library™ (MSAL)). If the communication protocol is capable of authenticating a requesting entity associated with the request, flow continues to step 806. Otherwise, flow continues to step 814.

In an example embodiment, step 804 includes making a determination whether the communication protocol is capable of performing multifactor authentication with regard to a requesting entity associated with the request. Examples of a communication protocol that is not capable of performing multifactor authentication with regard to a requesting entity include but are not limited to the TFTP communication protocol and the Sever Message Block™ (SMB) communication protocol. For instance, the SMB communication protocol allows shared access to network resources, such as files and printers, that support domain controlled-based authentication but lacks multifactor authentication and session control. In accordance with this embodiment, if the communication protocol is capable of performing multifactor authentication with regard to a requesting entity associated with the request, flow continues to step 806; otherwise, flow continues to step 814.

At step 806, an attempt is made to authenticate the requesting entity using an authentication technique of the communication protocol. In an example implementation, the authentication logic 614 attempts to authenticate the requesting entity using the authentication technique of the communication protocol.

At step 808, a determination is made whether the attempt to authenticate the requesting entity at step 806 is successful. In an example implementation, the authentication logic 614 determines whether the attempt to authenticate the requesting entity at step 806 is successful. The authentication logic 614 may be configured to generate a connection creation instruction 636, indicating that the network connection is to be created between the computing system 600 and the target network resource, based on the attempt to authenticate the requesting entity being successful. The authentication logic 614 may be configured not to generate the connection creation instruction 636 based on the attempt to authenticate the requesting entity being unsuccessful. If the attempt to authenticate the requesting entity is successful, flow continues to step 810. Otherwise, flow continues to step 812.

At step 810, the network connection between the computing system and the target network resource is created. In an example implementation, the connection creation logic 616 creates the network connection between the computing system 600 and the target network resource (e.g., based on receipt of the connection creation instruction 636). Upon completion of step 810, flowchart 800 ends.

At step 812, the network connection between the computing system and the target network resource is not created. In an example implementation, the connection creation logic 616 does not create the network connection between the computing system 600 and the target network resource (e.g., based on the connection creation instruction 636 not being received. Upon completion of step 812, flowchart 800 ends.

At step 814, a user interface that is configured to receive a credential of the requesting entity is provided. In an example implementation, the interface logic 618 provides a user interface 646 that is configured to receive a credential 642 of the requesting entity.

At step 816, the credential is received via the user interface. In an example implementation, the authentication logic 628 receives the credential 642. Upon completion of step 816, flow continues to step 818 in FIG. 8B.

At step 818, a determination is made whether the received credential and a reference credential that is associated with the requesting entity are same. In an example implementation, the authentication logic 628 determines whether the credential 642 and the reference credential are the same. The authentication logic 614 provides the connection creation instruction 636, indicating that the network connection is to be created between the computing system 600 and the target network resource, to the connection creation logic 616 if the credential 642 and the reference credential are the same. The authentication logic 614 does not provide the connection creation instruction 636 to the connection creation logic 616 if the credential 642 and the reference credential are not the same. If the received credential and the reference credential are the same, flow continues to step 820. Otherwise, flow continues to step 828.

In an example embodiment, a determination is made whether one or more other criteria, in addition to the received credential and the reference credential being the same, are satisfied. In accordance with this embodiment, if the received credential and the reference credential are the same and the one or more other criteria are satisfied, flow continues to step 820; otherwise, flow continues to step 828.

At step 820, a token that corresponds to the requesting entity is created. In an example implementation, the authentication logic 628 creates the token. In accordance with this implementation, the authentication logic 628 provides the token to the connection creation logic 616.

At step 822, the network connection is created between the computing system and the target network resource. In an example implementation, the connection creation logic 616 creates the network connection between the computing system 600 and the target network resource.

At step 824, packets of the network connection are intercepted. In an example implementation, the connection creation logic 616 intercepts the packets of the network connection. In another example implementation, the NaaS WFP callout driver 720 or a lightweight filter driver intercepts the outgoing network packets and injects incoming network packets to the network stack.

At step 826, the intercepted packets and the token that corresponds to the requesting entity are transferred to the network resource. In an example implementation, the connection creation logic 616 transfers the intercepted packets and the token that corresponds to the requesting entity to the network resource (e.g., for session control enforcement). Upon completion of step 826, flowchart 800 ends.

At step 828, the network connection is not created between the computing system and the target network resource. In an example implementation, the connection creation logic 616 does not create the network connection between the computing system 600 and the target network resource. Upon completion of step 828, flowchart 800 ends.

In some example embodiments, one or more steps 802, 804, 806, 808, 810, 812, 814, 816, 818, 820, 822, 824, 826, and/or 828 of flowchart 800 are not performed. Moreover, steps in addition to or in lieu of steps 802, 804, 806, 808, 810, 812, 814, 816, 818, 820, 822, 824, 826, and/or 828 may be performed.

Figure 9:
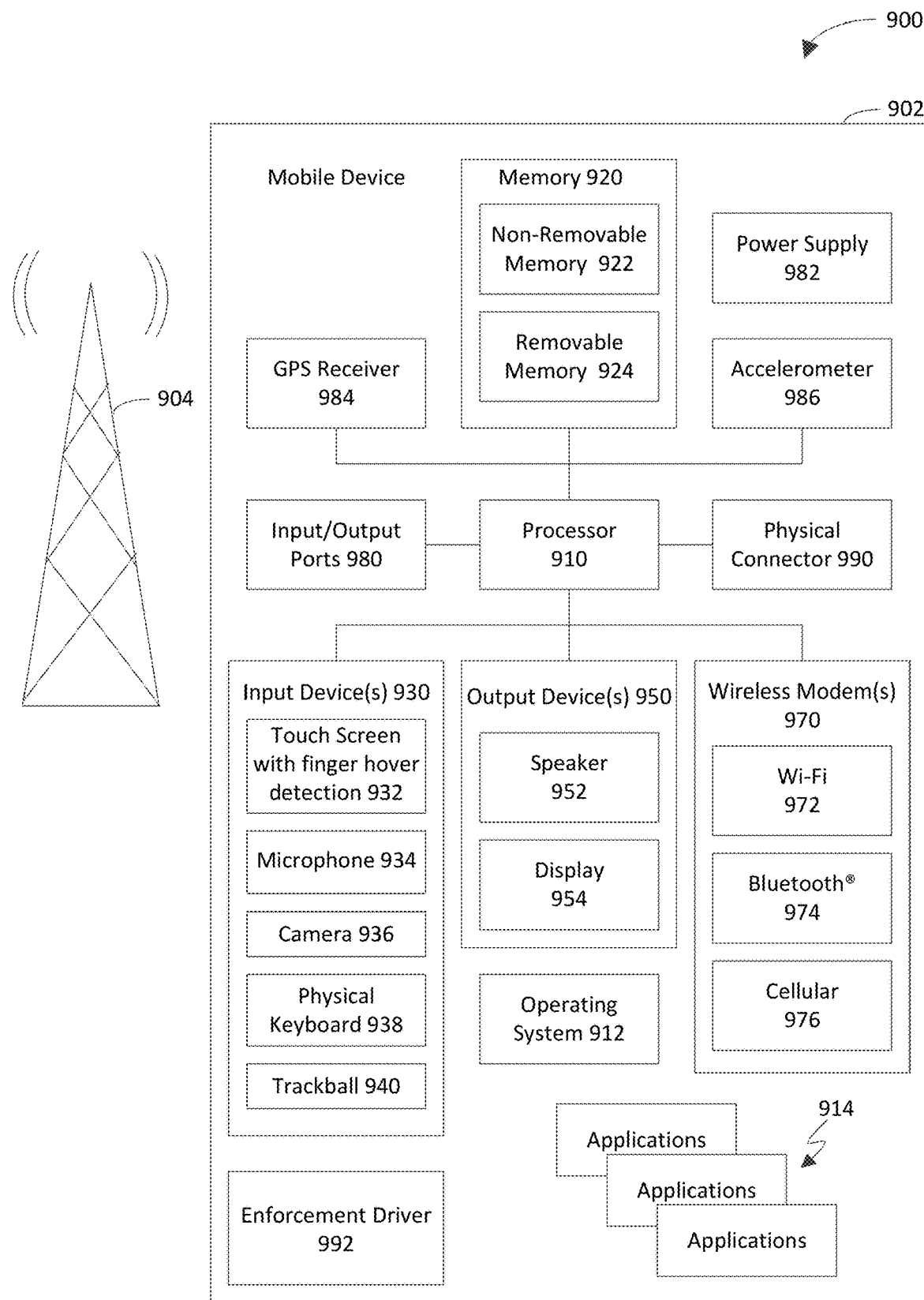
FIG. 9 is a system diagram of an example mobile device in accordance with an embodiment.

FIG. 9 is a system diagram of an example mobile device 900 including a variety of optional hardware and software components, shown generally as 902. Any components 902 in the mobile device may communicate with any other component, though not all connections are shown, for ease of illustration. The mobile device 900 may be any of a variety of computing devices (e.g., cell phone, smartphone, handheld computer, Personal Digital Assistant (PDA), etc.) and may allow wireless two-way communications with one or more mobile communications networks 904, such as a cellular or satellite network, or with a local area or wide area network.

The mobile device 900 includes a processor 910 (e.g., signal processor, microprocessor, ASIC, or other control and processing logic circuitry) for performing such tasks as signal coding, data processing, input/output processing, power control, and/or other functions. An operating system 912 may control the allocation and usage of the components 902 and support for one or more applications 914 (a.k.a. application programs). In an example embodiment, the operating system 912 is operable in a manner similar to the operating system 108 described above with reference to FIG. 1. The applications 914 may include common mobile computing applications (e.g., email applications, calendars, contact managers, web browsers, messaging applications) and any other computing applications (e.g., word processing applications, mapping applications, media player applications).

The mobile device 900 includes an enforcement driver 992, which is operable in a manner similar to the enforcement driver 110 described above with reference to FIG. 1 and/or the enforcement driver 610 described above with reference to FIG. 6.

The mobile device 900 includes memory 920. The memory 920 may include non-removable memory 922 and/or removable memory 924. The non-removable memory 922 may include random access memory (RAM), read-only memory (ROM), flash memory, a hard disk, or other well-known memory storage technologies. The removable memory 924 may include flash memory or a Subscriber Identity Module (SIM) card, which is well known in Global System for Mobile Communications (GSM) systems, or other well-known memory storage technologies, such as "smart cards." The memory 920 may store data and/or code for running the operating system 912, the applications 914, and the enforcement driver 992. Example data may include web pages, text, images, sound files, video data, or other data sets to be sent to and/or received from one or more network servers or other devices via one or more wired or wireless networks. Memory 920 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 900 may support one or more input devices 930, such as a touch screen 932, microphone 934, camera 936, physical keyboard 938 and/or trackball 940 and one or more output devices 950, such as a speaker 952 and a display 954. Touch screens, such as the touch screen 932, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 932 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 932 and display 954 may be combined in a single input/output device. The input devices 930 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 may include speech-recognition software as part of a voice control interface that allows a user to operate the mobile device 900 via voice commands. Furthermore, the mobile device 900 may include input devices and software that allows for user interaction via a user's spatial gestures, such as detecting and interpreting gestures to provide input to a gaming application.

Wireless modem(s) 970 may be coupled to antenna(s) (not shown) and may support two-way communications between the processor 910 and external devices, as is well understood in the art. The modem(s) 970 are shown generically and may include a cellular modem 976 for communicating with the mobile communication network 904 and/or other radio-based modems (e.g., Bluetooth® 974 and/or Wi-Fi 972). At least one of the wireless modem(s) 970 is typically configured for communication with one or more cellular networks, such as a GSM network for data and voice communications within a single cellular network, between cellular networks, or between the mobile device and a public switched telephone network (PSTN).

The mobile device may further include at least one input/output port 980, a power supply 982, a satellite navigation system receiver 984, such as a Global Positioning System (GPS) receiver, an accelerometer 986, and/or a physical connector 990, which may be a universal serial bus (USB) port, IEEE 1394 (FireWire) port, and/or RS-232 port. The illustrated components 902 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the operating system 108, the enforcement driver 110, the enforcement driver 610, the identity-based association logic 612, the security logic 614, the connection creation logic 616, the interface logic 618, the first association logic 622, the second association logic 624, the throttling logic 626, the authentication logic 628, the authorization logic 630, the I/O manager 708, the filter manager 710, the SMB connection driver 712, the WFP engine 714, the NaaS minifilter driver 716, the NaaS WFP callout driver 720, the NaaS platform 722, flowchart 200, flowchart 300, flowchart 400, flowchart 500, and/or flowchart 800 may be implemented in hardware, software, firmware, or any combination thereof.

For example, any one or more of the operating system 108, the enforcement driver 110, the enforcement driver 610, the identity-based association logic 612, the security logic 614, the connection creation logic 616, the interface logic 618, the first association logic 622, the second association logic 624, the throttling logic 626, the authentication logic 628, the authorization logic 630, the I/O manager 708, the filter manager 710, the SMB connection driver 712, the WFP engine 714, the NaaS minifilter driver 716, the NaaS WFP callout driver 720, the NaaS platform 722, flowchart 200, flowchart 300, flowchart 400, flowchart 500, and/or flowchart 800 may be implemented, at least in part, as computer program code configured to be executed in one or more processors.

In another example, any one or more of the operating system 108, the enforcement driver 110, the enforcement driver 610, the identity-based association logic 612, the security logic 614, the connection creation logic 616, the interface logic 618, the first association logic 622, the second association logic 624, the throttling logic 626, the authentication logic 628, the authorization logic 630, the I/O manager 708, the filter manager 710, the SMB connection driver 712, the WFP engine 714, the NaaS minifilter driver 716, the NaaS WFP callout driver 720, the NaaS platform 722, flowchart 200, flowchart 300, flowchart 400, flowchart 500, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
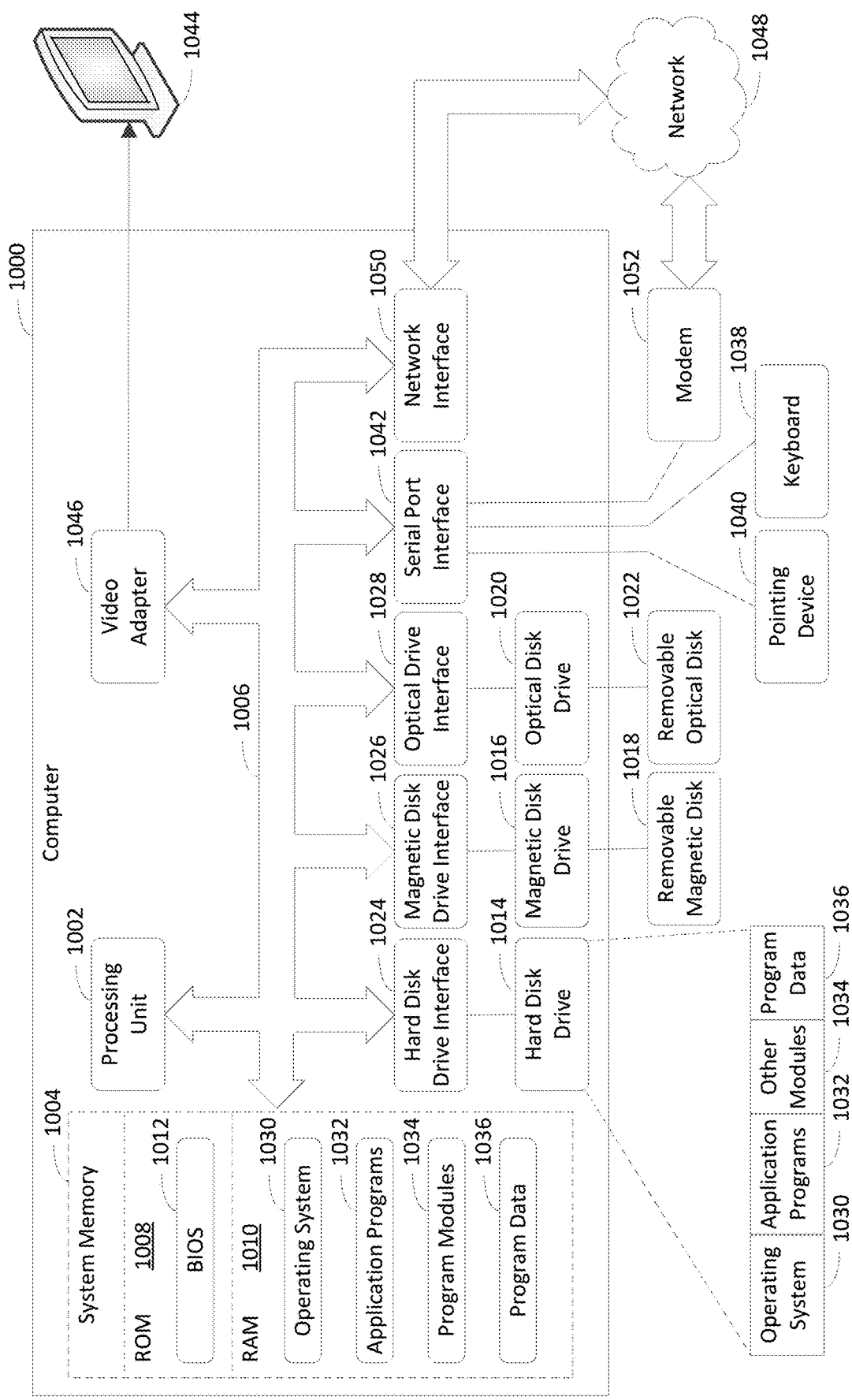
FIG. 10 depicts an example computer in which embodiments may be implemented.

III. Further Discussion of Some Example Embodiments (A1) An example system (FIG. 1, 102A-102M, 106A-106N; FIG. 6, 600; FIG. 9, 902; FIG. 10, 1000) to use a requestor identity to enforce a security policy (FIG. 6, 638)

on a network connection that conforms to a shared-access communication protocol comprises a memory (FIG. 9, 920, 922, 924; FIG. 10, 1004, 1008, 1010) and a processing system (FIG. 9, 910; FIG. 10, 1002) coupled to the memory. The processing system is configured to execute a driver (FIG. 1, 110; FIG. 6, 610; FIG. 7, 712, 716, 720; FIG. 9, 992). The driver is configured to receive (FIG. 2, 202) a request (FIG. 6, 632). The request requests creation of the network connection between the example system and a target network resource. The network connection conforms to a communication protocol that is configured to provide shared access to network resources (FIG. 1, 112). The driver is further configured to associate (FIG. 2, 204) the network connection with the requestor identity, which identifies a requesting entity associated with the request, by associating the request with the requestor identity and further by associating the network connection with the request. The driver is further configured to determine (FIG. 2, 206) whether the requesting entity is authorized to access the target network resource based at least in part on a permission that is indicated by the security policy. The driver is further configured to, based at least in part on the permission indicating that the requesting entity is authorized to access the target network resource, create (FIG. 2, 212) the network connection between the example system and the target network resource.

(A2) In the example system of A1, the security policy includes a preference associated with the requesting entity, the preference indicating that the network connection is to be created through a specified path; and wherein the driver is configured to: create the network connection through the specified path, which is selected from a plurality of paths based at least in part on the preference.

(A3) In the example system of any of A1-A2, wherein the request includes a file open request, which requests to open a file; wherein the target network resource includes the file; and wherein the driver is configured to: based at least in part on the permission indicating that the requesting entity is authorized to access the target network resource, enable the requesting entity to open the file.

(A4) In the example system of any of A1-A3, wherein the driver is further configured to: based at least in part on the request including a double-backslash, determine that the request includes the file open request, the double-backslash defined by two consecutive backslash characters.

(A5) In the example system of any of A1-A4, wherein the processing system is further configured to execute an operating system; and wherein the driver is further configured to: receive a protocol use indicator from the operating system, the protocol use indicator specifying that the communication protocol is to be used to access the target network resource.

(A6) In the example system of any of A1-A5, wherein the driver is further configured to: throttle requests that request access to the network resources such that the requests are processed one-at-a-time, the requests including the request that requests creation of the network connection between the example system and the target network resource.

(A7) In the example system of any of A1-A6, wherein the driver is configured to: provide a user interface that is configured to receive a credential of the requesting entity; receive the credential via the user interface; authenticate the requesting entity by performing multi-factor authentication based at least in part on the received credential corresponding to a reference credential that is associated with the requesting entity and further based at least in part on the network connection being associated with the requestor identity; and based at least in part on the permission indicating that the requesting entity is authorized to access the target network resource and further based at least in part on the requesting entity being authenticated, create the network connection between the example system and the target network resource.

(A8) In the example system of any of A1-A7, wherein the security policy includes a rule that prohibits multiple requesting entities from accessing a same network resource from a same machine within a specified period of time; wherein the driver is configured to: determine a machine from which the request is received; based at least in part on the rule, determine whether another requesting entity, other than the requesting entity associated with the request, has accessed the target network resource from the machine within the specified period of time prior to a current time; and based at least in part on the permission indicating that the requesting entity is authorized to access the target network resource and further based at least in part on a determination that another requesting entity has not accessed the target network resource from the machine within the specified period of time prior to the current time, create the network connection between the example system and the target network resource.

(A9) In the example system of any of A1-A8, wherein the driver is configured to: receive a second request, the second request requesting creation of a second network connection between the example system and a second target network resource, the second network connection conforming to the communication protocol that is configured to provide shared access to network resources; associate the second network connection with the requestor identity, which identifies the requesting entity associated with the second request, by associating the second request with the requestor identity and further by associating the second network connection with the second request; determine whether the requesting entity is authorized to access the second target network resource based at least in part on a second permission that is indicated by the security policy; and based at least in part on the second permission indicating that the requesting entity is not authorized to access the second target network resource, create the second network connection between the example system and another network resource in lieu of the second target network resource.

(B1) An example method of using a requestor identity to enforce a security policy (FIG. 6, 638) on a network connection that conforms to a shared-access communication protocol. The example method is implemented by a driver (FIG. 1, 110; FIG. 6, 610; FIG. 7, 712, 716, 720; FIG. 9, 992) that runs on a computing system (FIG. 1, 102A-102M, 106A-106N; FIG. 6, 600; FIG. 9, 902; FIG. 10, 1000). The example method comprises receiving (FIG. 2, 202) a request (FIG. 6, 632). The request requests creation of the network connection between the computing system and a target network resource. The network connection conforms to a communication protocol that is configured to provide shared access to network resources (FIG. 1, 112). The example method further comprises associating (FIG. 2, 204) the network connection with the requestor identity, which identifies a requesting entity associated with the request, by associating the request with the requestor identity and further by associating the network connection with the request. The example method further comprises determining (FIG. 2, 206) whether the requesting entity is authorized to access the target network resource based at least in part on a permission that is indicated by the security policy. The example method further comprises, based at least in part on the permission indicating that the requesting entity is authorized to access the target network resource, creating (FIG. 2, 212) the network connection between the computing system and the target network resource.

(B2) In the example method of B1, wherein the security policy includes a preference associated with the requesting entity, the preference indicating that the network connection is to be created through a specified path; and wherein creating the network connection comprises: creating the network connection through the specified path, which is selected from a plurality of paths based at least in part on the preference.

(B3) In the example method of any of B1-B2, wherein the request includes a file open request, which requests to open a file; wherein the target network resource includes the file; and wherein creating the network connection between the computing system and the target network resource comprises: enabling the requesting entity to open the file.

(B4) In the example method of any of B1-B3, further comprising: based at least in part on the request including a double-backslash, determining that the request includes the file open request, the double-backslash defined by two consecutive backslash characters.

(B5) In the example method of any of B1-B4, further comprising: receiving a protocol use indicator from an operating system that runs on the computing system, the protocol use indicator specifying that the communication protocol is to be used to access the target network resource.

(B6) In the example method of any of B1-B5, further comprising: throttling requests that request access to the network resources such that the requests are processed one-at-a-time, the requests including the request that requests creation of the network connection between the computing system and the target network resource.

(B7) In the example method of any of B1-B6, further comprising: providing a user interface that is configured to receive a credential of the requesting entity; receiving the credential via the user interface; and authenticating the requesting entity by performing multi-factor authentication based at least in part on the received credential corresponding to a reference credential that is associated with the requesting entity and further based at least in part on the network connection being associated with the requestor identity; wherein creating the network connection comprises: based at least in part on the permission indicating that the requesting entity is authorized to access the target network resource and further based at least in part on the requesting entity being authenticated, creating the network connection between the computing system and the target network resource.

(B8) In the example method of any of B1-B7, wherein the security policy includes a rule that prohibits multiple requesting entities from accessing a same network resource from a same machine within a specified period of time; wherein the example method further comprises: determining a machine from which the request is received; and based at least in part on the rule, determining whether another requesting entity, other than the requesting entity associated with the request, has accessed the target network resource from the machine within the specified period of time prior to a current time; and wherein creating the network connection comprises: based at least in part on the permission indicating that the requesting entity is authorized to access the target network resource and further based at least in part on a determination that another requesting entity has not accessed the target network resource from the machine within the specified period of time prior to the current time, creating the network connection between the computing system and the target network resource.

(B9) In the example method of any of B1-B8, further comprising: receiving a second request, the second request requesting creation of a second network connection between the computing system and a second target network resource, the second network connection conforming to the communication protocol that is configured to provide shared access to network resources; associating the second network connection with the requestor identity, which identifies the requesting entity associated with the second request, by associating the second request with the requestor identity and further by associating the second network connection with the second request; determining whether the requesting entity is authorized to access the second target network resource based at least in part on a second permission that is indicated by the security policy; and based at least in part on the second permission indicating that the requesting entity is not authorized to access the second target network resource, creating the second network connection between the computing system and another network resource in lieu of the second target network resource.

(C1) An example computer program product (FIG. 9, 924; FIG. 10, 1018, 1022) comprising a computer-readable storage medium having instructions recorded thereon for enabling a processor-based system (FIG. 1, 102A-102M, 106A-106N; FIG. 6, 600; FIG. 9, 902; FIG. 10, 1000) to use a requestor identity to enforce a security policy (FIG. 6, 638) on a network connection that conforms to a shared-access communication protocol by performing operations. The operations comprise receiving (FIG. 2, 202) a request (FIG. 6, 632). The request requests creation of the network connection between the processor-based system and a target network resource. The network connection conforming to a communication protocol that is configured to provide shared access to network resources (FIG. 1, 112). The operations further comprise associating (FIG. 2, 204) the network connection with the requestor identity, which identifies a requesting entity associated with the request, by associating the request with the requestor identity and further by associating the network connection with the request. The operations further comprise determining (FIG. 2, 206) whether the requesting entity is authorized to access the target network resource based at least in part on a permission that is indicated by the security policy. The operations further comprise, based at least in part on the permission indicating that the requesting entity is authorized to access the target network resource, creating (FIG. 2, 212) the network connection between the processor-based system and the target network resource.

IV. Example Computer System

FIG. 10 depicts an example computer 1000 in which embodiments may be implemented. Any one or more of the client devices 102A-102M and/or any one or more of the servers 106A-106N shown in FIG. 1 and/or computing system 600 shown in FIG. 6 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read-only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the operating system 108, the enforcement driver 110, the enforcement driver 610, the identity-based association logic 612, the security logic 614, the connection creation logic 616, the interface logic 618, the first association logic 622, the second association logic 624, the throttling logic 626, the authentication logic 628, the authorization logic 630, flowchart 200 (including any step of flowchart 200), flowchart 300 (including any step of flowchart 300), flowchart 400 (including any step of flowchart 400), flowchart 500 (including any step of flowchart 500), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use a requestor identity to enforce a security policy on a network connection that conforms to a shared-access communication protocol, the system comprising:
a memory;
a processing system coupled to the memory, the processing system configured to execute a driver; and
the driver configured to:
receive a request,
the request requesting creation of the network connection between the system and a target network resource,
the network connection conforming to a communication protocol that is configured to provide shared access to network resources;
authenticate a requesting entity associated with the request by associating the network connection, which is yet to be created, with the requestor identity in lieu of comparing a credential of the requesting entity to a reference credential, wherein the requestor identity identifies the requesting entity, wherein authentication of the requesting entity by associating the network connection with the requestor identity is performed by associating the request with the requestor identity and further by associating the network connection with the request;
determine whether the requesting entity is authorized to access the target network resource based at least on a permission that is indicated by the security policy;
based at least on the permission indicating that the requesting entity is authorized to access the target network resource, create the network connection between the system and the target network resource;
receive a second request,
the second request requesting creation of a second network connection between the system and a second target network resource,
the second network connection conforming to the communication protocol that is configured to provide shared access to network resources;
associate the second network connection with the requestor identity, which identifies the requesting entity associated with the second request, by associating the second request with the requestor identity and further by associating the second network connection with the second request;
determine whether the requesting entity is authorized to access the second target network resource based at least on a second permission that is indicated by the security policy; and
based at least on the second permission indicating that the requesting entity is not authorized to access the second target network resource, create the second network connection between the system and another network resource in lieu of the second target network resource.

2. The system of claim 1, wherein the security policy includes a preference associated with the requesting entity, the preference indicating that the network connection is to be created through a specified path; and
wherein the driver is configured to:
create the network connection through the specified path, which is selected from a plurality of paths based at least on the preference.

3. The system of claim 1, wherein the request includes a file open request, which requests to open a file;
wherein the target network resource includes the file; and
wherein the driver is configured to:
based at least on the permission indicating that the requesting entity is authorized to access the target network resource, enable the requesting entity to open the file.

4. The system of claim 3, wherein the driver is further configured to:
based at least on the request including a double-backslash, determine that the request includes the file open request, the double-backslash defined by two consecutive backslash characters.

5. The system of claim 1, wherein the processing system is further configured to execute an operating system; and
wherein the driver is further configured to:
receive a protocol use indicator from the operating system, the protocol use indicator specifying that the communication protocol is to be used to access the target network resource.

6. The system of claim 1, wherein the driver is further configured to:
throttle requests that request access to the network resources such that the requests are processed one-at-a-time, the requests including the request that requests creation of the network connection between the system and the target network resource.

7. The system of claim 1, wherein the driver is configured to:
provide a user interface that is configured to receive a credential of the requesting entity;
receive the credential via the user interface;
authenticate the requesting entity by performing multi-factor authentication based at least on the received credential corresponding to a reference credential that is associated with the requesting entity and further based at least in part on the network connection being associated with the requestor identity; and
based at least on the permission indicating that the requesting entity is authorized to access the target network resource and further based at least on the requesting entity being authenticated, create the network connection between the system and the target network resource.

8. The system of claim 1, wherein the security policy includes a rule that prohibits multiple requesting entities from accessing a same network resource from a same machine within a specified period of time;
wherein the driver is configured to:
determine a machine from which the request is received;
based at least on the rule, determine whether another requesting entity, other than the requesting entity associated with the request, has accessed the target network resource from the machine within the specified period of time prior to a current time; and
based at least on the permission indicating that the requesting entity is authorized to access the target network resource and further based at least on a determination that another requesting entity has not accessed the target network resource from the machine within the specified period of time prior to the current time, create the network connection between the system and the target network resource.

9. A method of using a requestor identity to enforce a security policy on a network connection that conforms to a shared-access communication protocol, the method implemented by a driver that runs on a computing system, the method comprising:
  receiving a request,
    the request requesting creation of the network connection between the computing system and a target network resource,
    the network connection conforming to a communication protocol that is configured to provide shared access to network resources;
  authenticating a requesting entity associated with the request by associating the network connection, which is yet to be created, with the requestor identity in lieu of comparing a credential of the requesting entity to a reference credential, wherein the requestor identity identifies the requesting entity, wherein authenticating the requesting entity by associating the network connection with the requestor identity is performed by associating the request with the requestor identity and further by associating the network connection with the request;
  determining whether the requesting entity is authorized to access the target network resource based at least on a permission that is indicated by the security policy;
  based at least on the permission indicating that the requesting entity is authorized to access the target network resource, creating the network connection between the computing system and the target network resource;
  receiving a second request,
    the second request requesting creation of a second network connection between the computing system and a second target network resource,
    the second network connection conforming to the communication protocol that is configured to provide shared access to network resources;
  associating the second network connection with the requestor identity, which identifies the requesting entity associated with the second request, by associating the second request with the requestor identity and further by associating the second network connection with the second request;
  determining whether the requesting entity is authorized to access the second target network resource based at least in part on a second permission that is indicated by the security policy; and
  based at least in part on the second permission indicating that the requesting entity is not authorized to access the second target network resource, creating the second network connection between the computing system and another network resource in lieu of the second target network resource.

10. The method of claim 9, wherein the security policy includes a preference associated with the requesting entity, the preference indicating that the network connection is to be created through a specified path; and
  wherein creating the network connection comprises:
    creating the network connection through the specified path, which is selected from a plurality of paths based at least on the preference.

11. The method of claim 9, wherein the request includes a file open request, which requests to open a file;
  wherein the target network resource includes the file; and
  wherein creating the network connection between the computing system and the target network resource comprises:
    enabling the requesting entity to open the file.

12. The method of claim 11, further comprising:
  based at least on the request including a double-backslash, determining that the request includes the file open request, the double-backslash defined by two consecutive backslash characters.

13. The method of claim 9, further comprising:
  receiving a protocol use indicator from an operating system that runs on the computing system, the protocol use indicator specifying that the communication protocol is to be used to access the target network resource.

14. The method of claim 9, further comprising:
  throttling requests that request access to the network resources such that the requests are processed one-at-a-time, the requests including the request that requests creation of the network connection between the computing system and the target network resource.

15. The method of claim 9, further comprising:
  providing a user interface that is configured to receive a credential of the requesting entity;
  receiving the credential via the user interface; and
  authenticating the requesting entity by performing multi-factor authentication based at least on the received credential corresponding to a reference credential that is associated with the requesting entity and further based at least on the network connection being associated with the requestor identity;
  wherein creating the network connection comprises:
    based at least on the permission indicating that the requesting entity is authorized to access the target network resource and further based at least on the requesting entity being authenticated, creating the network connection between the computing system and the target network resource.

16. The method of claim 9, wherein the security policy includes a rule that prohibits multiple requesting entities from accessing a same network resource from a same machine within a specified period of time;
  wherein the method further comprises:
    determining a machine from which the request is received; and
    based at least on the rule, determining whether another requesting entity, other than the requesting entity associated with the request, has accessed the target network resource from the machine within the specified period of time prior to a current time; and
  wherein creating the network connection comprises:
    based at least on the permission indicating that the requesting entity is authorized to access the target network resource and further based at least on a determination that another requesting entity has not accessed the target network resource from the machine within the specified period of time prior to the current time, creating the network connection between the computing system and the target network resource.

17. A computer program product comprising a computer-readable storage medium having instructions recorded thereon for enabling a processor-based system to use a requestor identity to enforce a security policy on a network connection that conforms to a shared-access communication protocol by performing operations, the operations comprising:
  receiving a request,
    the request requesting creation of the network connection between the processor-based system and a target network resource, the network connection conforming to a communication protocol that is configured to provide shared access to network resources;
authenticating a requesting entity associated with the request by associating the network connection, which is yet to be created, with the requestor identity in lieu of comparing a credential of the requesting entity to a reference credential, wherein the requestor identity identifies the requesting entity, wherein associating the network connection with the requestor identity comprises associating the request with the requestor identity and further comprises associating the network connection with the request;
determining whether the requesting entity is authorized to access the target network resource based at least on the security policy;
based at least on the requesting entity being authorized to access the target network resource, creating the network connection between the processor-based system and the target network resource;
receiving a second request,
   the second request requesting creation of a second network connection between the system and a second target network resource,
   the second network connection conforming to the communication protocol that is configured to provide shared access to network resources;
associating the second network connection with the requestor identity, which identifies the requesting entity associated with the second request, by associating the second request with the requestor identity and further by associating the second network connection with the second request;
determining whether the requesting entity is authorized to access the second target network resource based at least on the security policy; and
based at least on the requesting entity not being authorized to access the second target network resource, creating the second network connection between the system and another network resource rather than the second target network resource.

18. The computer program product of claim 17, wherein the operations further comprise:
throttling requests that request access to the network resources such that the requests are processed one-at-a-time, the requests including the request that requests creation of the network connection between the computing system and the target network resource.

19. The computer program product of claim 17, wherein the security policy includes a preference associated with the requesting entity, the preference indicating that the network connection is to be created through a particular path; and
wherein the operations comprise:
   creating the network connection through the particular path, which is selected from a plurality of paths based at least on the preference.

20. The computer program product of claim 17, wherein the security policy includes a rule that prohibits multiple requesting entities from accessing a same network resource from a same machine within a specified period of time;
wherein the operations comprise:
   determining a machine from which the request is received;
   based at least on the rule, determining whether another requesting entity, other than the requesting entity associated with the request, has accessed the target network resource from the machine within the specified period of time prior to a current time; and
   based at least on the permission indicating that the requesting entity is authorized to access the target network resource and further based at least on a determination that another requesting entity has not accessed the target network resource from the machine within the specified period of time prior to the current time, creating the network connection between the system and the target network resource.

* * * * *